(12) United States Patent
Sasaki

(10) Patent No.: US 6,631,550 B2
(45) Date of Patent: Oct. 14, 2003

(54) METHOD OF MANUFACTURING A THIN-FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 115 days.

(21) Appl. No.: 09/897,498

(22) Filed: Jul. 3, 2001

(65) Prior Publication Data

US 2001/0042302 A1 Nov. 22, 2001

Related U.S. Application Data

(62) Division of application No. 09/338,529, filed on Jun. 23, 1999, now Pat. No. 6,285,532.

(30) Foreign Application Priority Data

Jul. 10, 1998 (JP) .......................................... 10-195408

(51) Int. Cl.[7] .............................................. G11B 5/127
(52) U.S. Cl. ................................ 29/603.14; 29/603.13; 29/603.24; 360/319
(58) Field of Search .......................... 29/603.7, 603.13, 29/603.14, 603.23, 603.24; 360/317, 319; 427/528, 531, 131, 132, 123, 124

(56) References Cited

U.S. PATENT DOCUMENTS

| | | | | |
|---|---|---|---|---|
| 4,841,624 A | * | 6/1989 | Togawa et al. | 29/603.14 |
| 5,168,409 A | * | 12/1992 | Koyama et al. | 360/317 |
| 5,241,440 A | * | 8/1993 | Ashida et al. | 360/126 |
| 5,649,351 A | * | 7/1997 | Cole et al. | 29/603.14 |
| 5,722,157 A | * | 3/1998 | Shouji et al. | 29/603.14 |
| 6,034,848 A | | 3/2000 | Garfunkel et al. | |
| 6,154,346 A | | 11/2000 | Sasaki | |
| 6,154,347 A | | 11/2000 | Sasaki | |

* cited by examiner

*Primary Examiner*—Carl J. Arbes
*Assistant Examiner*—Tai Nguyen
(74) *Attorney, Agent, or Firm*—Oliff & Berridge, PLC

(57) ABSTRACT

A method of manufacturing a thin-film magnetic head includes the steps of: forming a first shield layer and a first portion of a second shield layer to be placed in one plane and insulated from each other; forming at least part of a thin-film coil on the first portion of the second shield layer such that the coil is insulated from the first portion; forming a first insulating layer on the first shield layer; forming a magnetoresistive element on the first insulating layer; forming a second insulating layer on the magnetoresistive element; forming a second portion of the second shield layer on the second insulating layer; forming a gap layer on the second portion of the second shield layer; and forming a second magnetic layer on the gap layer.

12 Claims, 16 Drawing Sheets

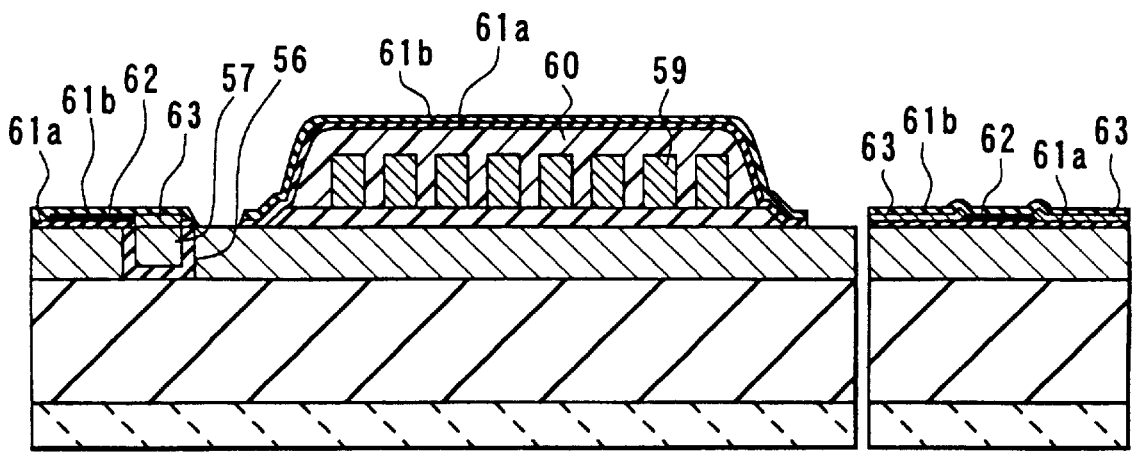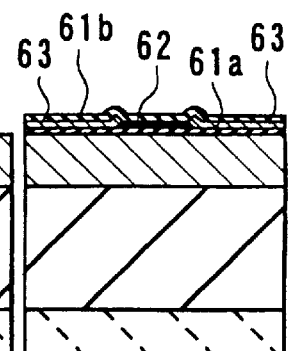
FIG. 4A    FIG. 4B
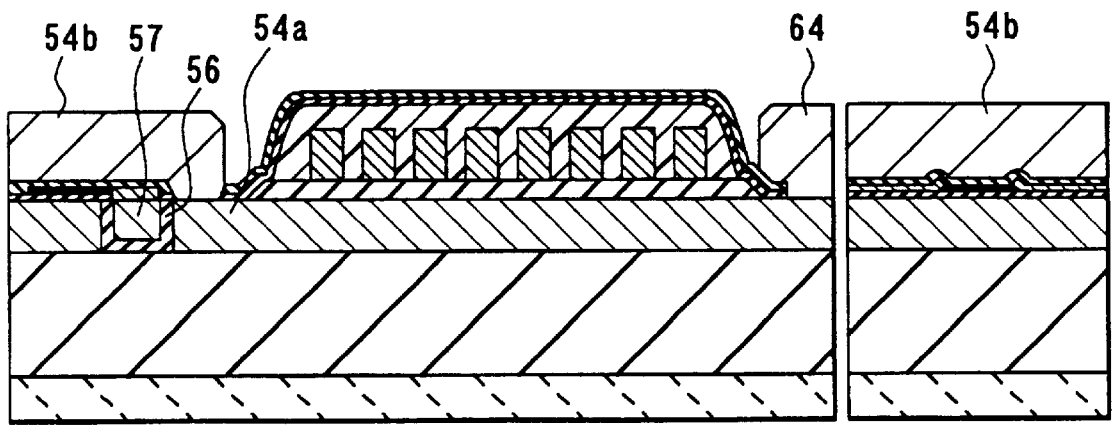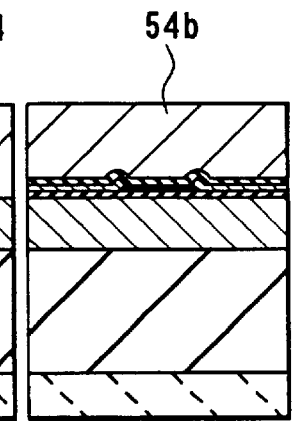
FIG. 5A    FIG. 5B

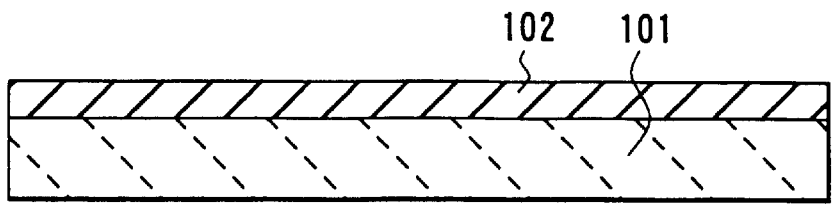 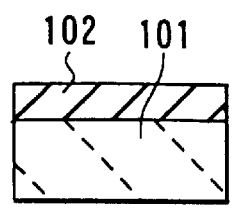
FIG. 15A
RELATED ART
FIG. 15B
RELATED ART
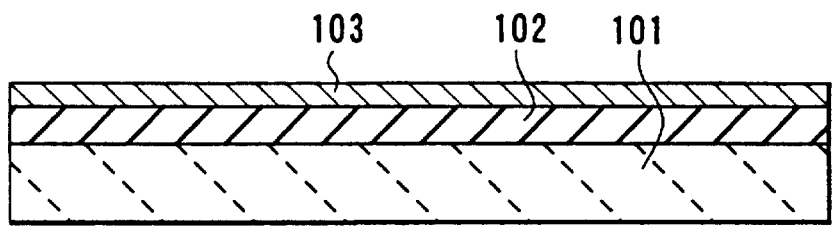 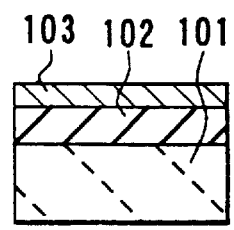
FIG. 16A
RELATED ART
FIG. 16B
RELATED ART
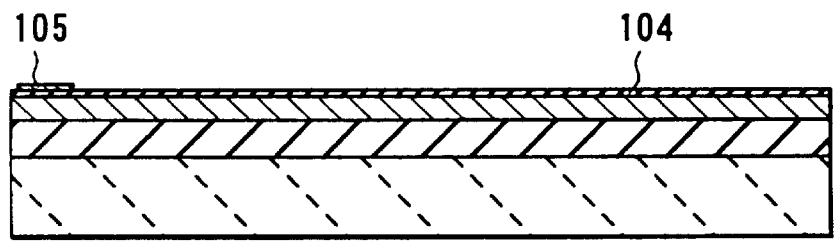 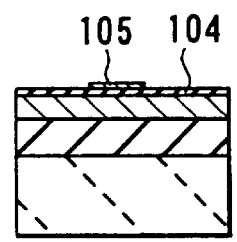
FIG. 17A
RELATED ART
FIG. 17B
RELATED ART
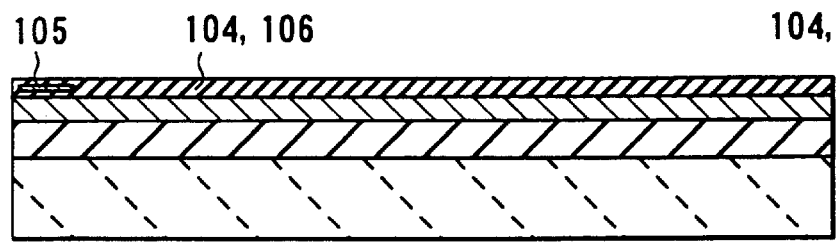 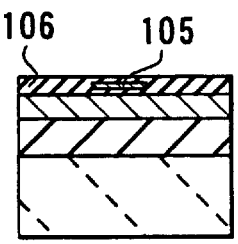
FIG. 18A
RELATED ART
FIG. 18B
RELATED ART

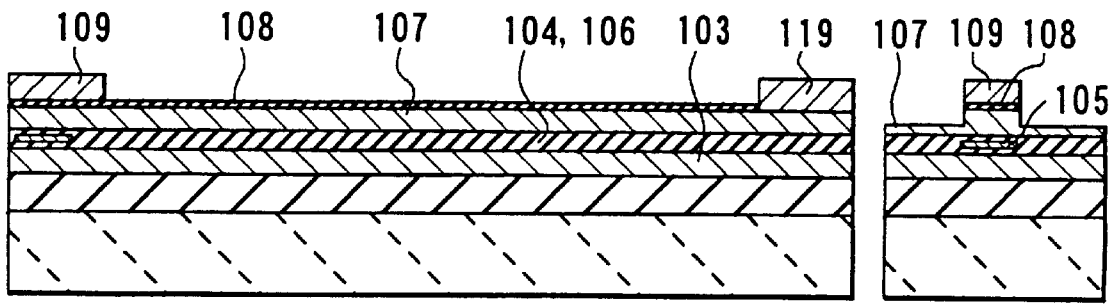
FIG. 19A
RELATED ART
FIG. 19B
RELATED ART
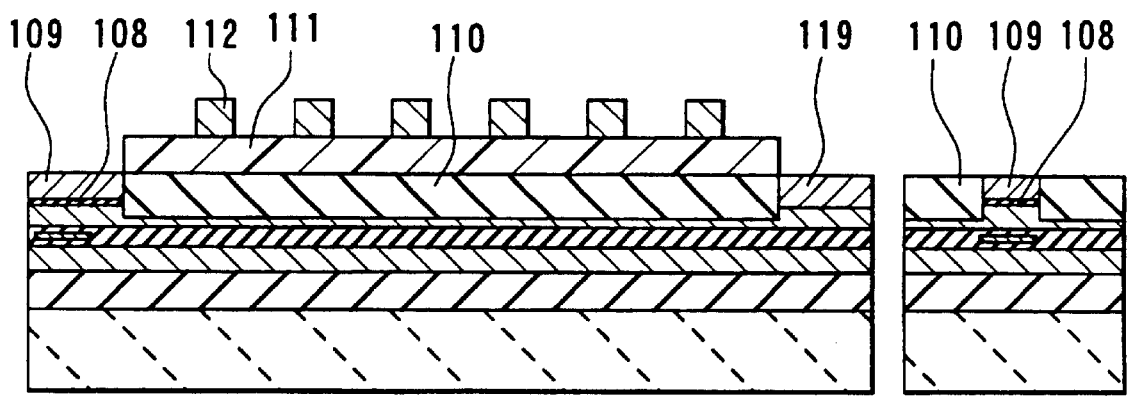
FIG. 20A
RELATED ART
FIG. 20B
RELATED ART

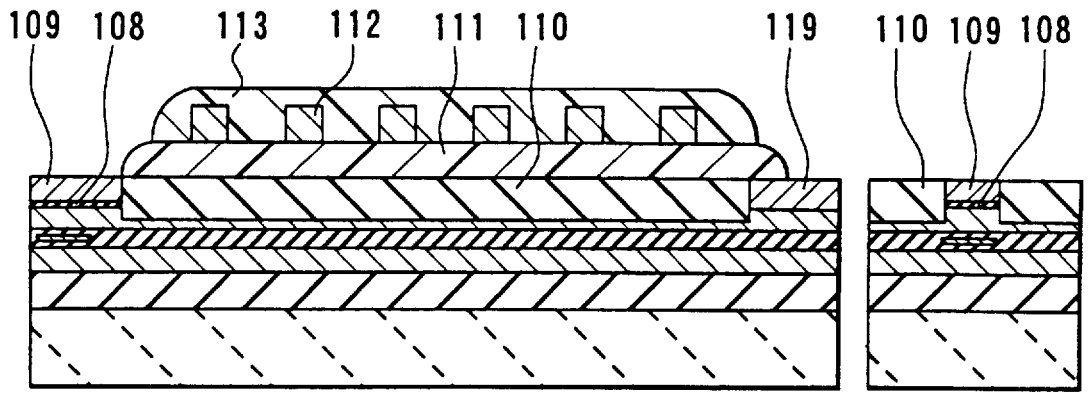
FIG. 21A
RELATED ART
FIG. 21B
RELATED ART
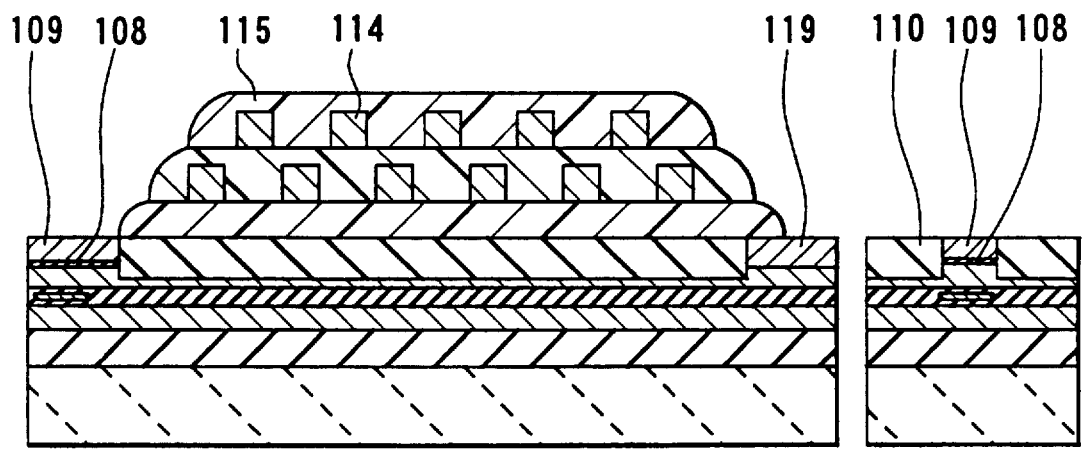
FIG. 22A
RELATED ART
FIG. 22B
RELATED ART

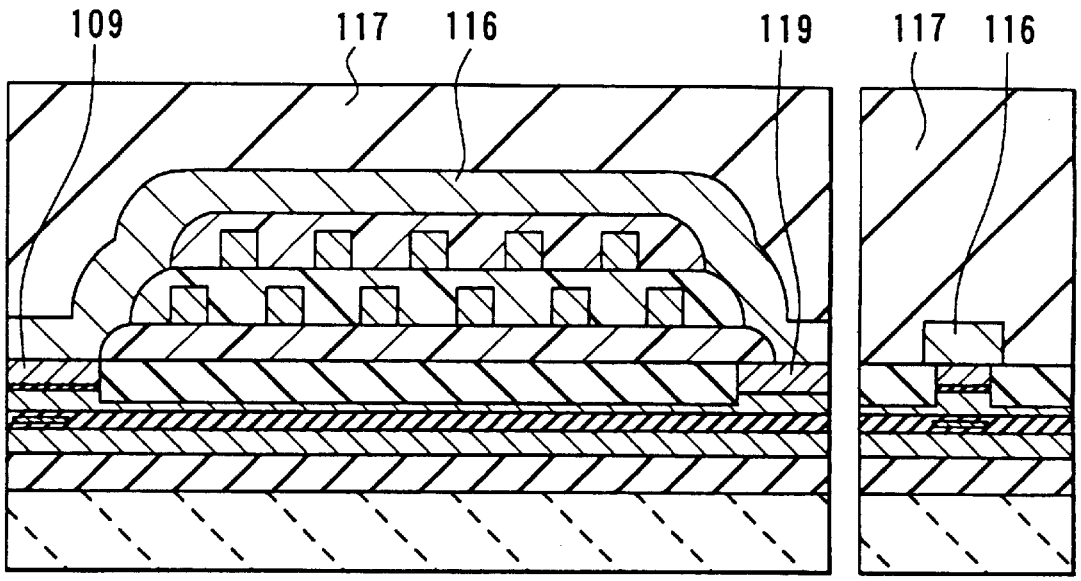
FIG. 23A
RELATED ART
FIG. 23B
RELATED ART
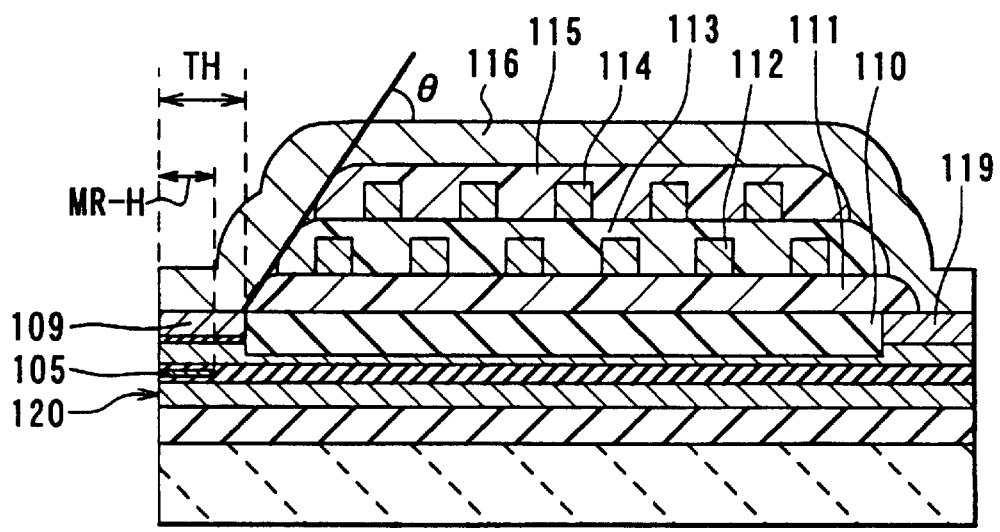
FIG. 24
RELATED ART

METHOD OF MANUFACTURING A THIN-FILM MAGNETIC HEAD

This is a division of application Ser. No. 09/338,529 filed Jun. 23, 1999 U.S. Pat. No. 6,285,532. The entire disclosure of the prior application(s) is hereby incorporated by reference herein in its entirety.

BACKGROUND OF THE INVENTION

1. Field of Invention

The present invention relates to a composite thin-film magnetic head comprising a recording head and a reproducing head and a method of manufacturing such a thin-film magnetic head, and to a thin-film magnetic head sub-structure used for producing such a thin-film magnetic head and a method of manufacturing such a thin-film magnetic head sub-structure.

2. Description of Related Art

Performance improvements in thin-film magnetic heads have been sought as surface recording density of hard disk drives has increased. Composite thin-film magnetic heads have been widely used. A composite head is made of a layered structure including a recording head having an induction magnetic transducer for writing and a reproducing head having a magnetoresistive (MR) element for reading. MR elements include an an isotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head whose surface recording density is more than 1 gigabit per square inch. A GMR head is used as a reproducing head whose surface recording density is more than 3 gigabits per square inch.

An AMR head comprises an AMR film having the AMR effect. In place of the AMR film a GMR head comprises a GMR film having the GMR effect. The configuration of the GMR head is similar to that of the AMR head. However, the GMR film exhibits a greater change in resistance under a specific external magnetic field compared to the AMR film. As a result, the reproducing output of the GMR head is about three to five times as great as that of the AMR head.

The MR film may be replaced in order to improve the performance of a reproducing head. In general, an AMR film is made of a magnetic substance that exhibits the MR effect and has a single-layer structure. In contrast, many of GMR films have a multilayer structure consisting of a plurality of films. There are several types of mechanisms of producing the GMR effect. The layer structure of a GMR film depends on the type of mechanism. GMR films include a superlattice GMR film, a granular film, a spin valve film and so on. The spin valve film is most efficient since the film has a relatively simple structure, exhibits a great change in resistance in a low magnetic field, and suitable for mass production. The performance of the reproducing head is thus easily improved by replacing the AMR film with a GMR film and the like with an excellent magnetoresistive sensitivity.

Besides selection of a structure as described above, a pattern width such as an MR height, in particular, determines the performance of a reproducing head. The MR height is the length (height) between the end of the MR element closer to the air bearing surface (medium facing surface) and the other end. The MR height is basically controlled by an amount of lapping when the air bearing surface is processed.

Performance improvements in a recording head are also required as the performance of a reproducing head is improved. It is required to increase the track density on a magnetic recording medium in order to increase recording density among the performance characteristics of a recording head. To achieve this, it is required to implement a recording head of a narrow track structure by performing submicron processing on a magnetic layer making up a top pole through the use of semiconductor process techniques. It is also required to use a magnetic material having higher saturation flux density.

Another factor determining the recording head performance is a throat height. The throat height is the length (height) of a portion (called a pole portion in the invention) between the air bearing surface and the end of the insulating layer electrically isolating the thin-film coil. A reduction in throat height is desired in order to improve the recording head performance. The throat height is controlled as well by an amount of lapping when the air bearing surface is processed.

As thus described, it is important to fabricate well-balanced recording and reproducing heads to improve the performance of a thin-film magnetic head.

Reference is now made to FIG. 15A to FIG. 23A, FIG. 15B to FIG. 23B, and FIG. 24 to FIG. 27 to describe an example of a manufacturing method of a composite thin-film magnetic head as an example of a manufacturing method of a related-art thin-film magnetic head. FIG. 15A to FIG. 23A are cross sections each orthogonal to the air bearing surface. FIG. 15B to FIG. 23B are cross sections each parallel to the air bearing surface of the pole portion.

According to the manufacturing method, as shown in FIG. 15A and FIG. 15B, an insulating layer 102 made of alumina ($Al_2O_3$), for example, of about 5 to 10 $\mu$m in thickness is deposited on a substrate 101 made of aluminum oxide and titanium carbide ($Al_2O_3$—TiC), for example.

Next, as shown in FIG. 16A and FIG. 16B, on the insulating layer 102 a bottom shield layer 103 made of a magnetic material is formed for a reproducing head.

Next, as shown in FIG. 17A and FIG. 17B, on the bottom shield layer 103 alumina or aluminum nitride, for example, of 100 to 200 nm in thickness is deposited through sputtering to form a bottom shield gap film 104 as an insulating layer. On the bottom shield gap film 104 an MR film of tens of nanometers in thickness is formed for making an MR element 105 for reproduction. Next, with a photoresist pattern as a mask, the MR film is etched through ion milling, for example, to form the MR element 105. The MR element 105 may be either a GMR element or an AMR element.

Next, as shown in FIG. 18A and FIG. 18B, a top shield gap film 106 is formed as an insulating layer on the bottom shield gap film 104 and the MR element 105. The MR element 105 is embedded in the shield gap films 104 and 106.

Next, as shown in FIG. 19A and FIG. 19B, on the top shield gap film 106 a top shield layer-cum-bottom pole layer (called top shield layer in the following description) 107 is formed. The top shield layer 107 is made of a magnetic material and used for both a reproducing head and a recording head.

Next, a recording gap layer 108 made of an insulating film such as an alumina film is formed on the top shield layer 107. Next, the recording gap layer 108 is partially etched in a backward portion (the right side of FIG. 19A) to form a contact hole for making a magnetic path. Next, a top pole tip 109 for the recording head is formed on the pole portion of the recording gap layer 108. The top pole layer 109 is made of a magnetic material such as Permalloy (NiFe) or FeN as a high saturation flux density material. At the same time, a magnetic layer 119 made of a magnetic material is formed for making the magnetic path in the contact hole for making the magnetic path.

Next, the recording gap layer 108 and the top shield layer (bottom pole layer) 107 are etched through ion milling, using the top pole tip 109 as a mask. As shown in FIG. 19B, the structure is called a trim structure wherein the sidewalls of the top pole (the top pole tip 109), the recording gap layer 108, and part of the top shield layer (bottom pole layer) 107 are formed vertically in a self-aligned manner. The trim structure suppresses an increase in the effective track width due to expansion of the magnetic flux generated during writing in a narrow track.

Next, as shown in FIG. 20A and FIG. 20B, an insulating layer 110 of alumina, for example, having a thickness of about 3 μm is formed over the entire surface. The insulating layer 110 is polished to the surfaces of the pole tip 109 and the magnetic layer 119 and flattened. The polishing method may be mechanical polishing or chemical mechanical polishing (CMP). The surfaces of the pole tip 109 and the magnetic layer 119 are thereby exposed.

On the flattened insulating layer 110 a photoresist layer 111 is formed into a specific pattern through high-precision photolithography. Next, on the photoresist layer 111 a thin-film coil 112 of a first layer is made for the induction-type recording head. The thin-film coil 112 is made of copper (Cu), for example.

Next, as shown in FIG. 21A and FIG. 21B, a photoresist layer 113 is formed into a specific pattern on the photoresist layer 111 and the coil 112. Heat treatment is performed at a temperature of 250 to 300° C., for example, to flatten the surface of the photoresist layer 113.

Next, as shown in FIG. 22A and FIG. 22B, a thin-film coil 114 of a second layer is formed on the photoresist layer 113. Next, a photoresist layer 115 is formed into a specific pattern on the photoresist layer 113 and the coil 114. Heat treatment is performed at a temperature of 250 to 300° C., for example, to flatten the surface of the photoresist layer 115.

Next, as shown in FIG. 23A and FIG. 23B, a top yoke layer 116 for the recording head is formed on the top pole tip 109, the photoresist layers 111, 113 and 115 and the magnetic layer 119. The top yoke layer 116 is made of a magnetic material such as Permalloy. Next, an overcoat layer 117 of alumina, for example, is formed to cover the top yoke layer 116. Finaymachine processing of the slider is performed to form the air bearing surface of the recording head and the reproducing head. The thin-film magnetic head is thus completed.

FIG. 24 and FIG. 25 show the completed thin-film magnetic head. FIG. 24 is a cross section of the head orthogonal to the air bearing surface 120. FIG. 25 is an enlarged cross section of the pole portion parallel to the air bearing surface 120. In FIG. 24 the throat height is indicated with 'TH' and the MR height is indicated with 'MR-H'. As shown in FIG. 25, a first conductive layer 121 is provided on the side of the MR element 105.

In addition to the throat height and the MR height, another factor that determines the performance of a thin-film magnetic head is an apex angle as indicated with θ in FIG. 24. The apex is a hill-like coil portion covered with the photoresist layers 111, 113 and 115. The apex angle is an angle formed between the top surface of the insulating layer 110 and the straight line drawn through the edges of the pole-side lateral walls of the apex.

FIG. 26 is a top view of the thin-film magnetic head manufactured as described above in a state halfway through the manufacturing process. FIG. 27 is a top view of the head manufactured as described above. FIG. 26 shows the state wherein the bottom shield layer 103, the MR element 105, and the top shield layer (bottom pole layer) 107 are formed. The overcoat layer 117 is omitted in FIG. 27. FIG. 15A to FIG. 23A are cross sections taken along line 23A—23A of FIG. 27. FIG. 15B to FIG. 23B are cross sections taken along line 23B—23B of FIG. 27.

The performance and characteristics of a thin-film magnetic head are mainly determined by the MR element of the reproducing head and the pole portion of the recording head. To be specific, the performance and characteristics of the reproducing head are mainly determined by the track width of the reproducing head, corresponding to the MR element width. The performance and characteristics of the recording head are mainly determined by the pole portion dimensions such as the throat height and the track width of the recording head. Therefore, the demands of clients of thin-film heads are concentrated on matters relating to the process of making the MR element of the reproducing head and the pole portion of the recording head, such as the track width of the reproducing head and the throat height and the track width of the recording head.

Therefore, in order to mass-produce thin-film magnetic heads that satisfy the specifications required by the customer, it is necessary that the manufacturing steps taken to fabricate the MR element and steps that follow should conform to the customer's demands.

However, as described above with reference to the drawings, the steps taken to fabricate the MR element belong to the early part of the entire steps of mass-producing thin-film heads, according to the related-art method. This is similar to other prior-art methods of manufacturing thin-film heads. Therefore, the time required for steps taken to fabricate the MR element and steps that follow make up a great proportion of the time required for the entire steps in the prior-art methods. In the prior art a long cycle time is therefore required. The cycle time is a period required between receipt of an order from the customer and completion and shipment of products conforming to the specifications required by the customer. The cycle time is about 20 to 25 days, for example. It is 30 to 40 days in some cases. Even though an agreement is made in an early stage between the customer and the manufacturer with regard to the specifications of thin-film heads such as performance characteristics, it takes many days to finally ship products.

These days technology advances at a remarkable rate and improvements are noticeable in surface recording density and reproduction rate required by the customer. Accordingly, modifications and improvements are made to the specifications of hard disk drives of computers every several months. Therefore, the customer demands that thin-film heads meeting the requirements are shipped in a short time after the order. The manufacturer is thus required to design products meeting the specifications required by the customer, mass-produce and ship the products in a short time.

Under such circumstances, it is difficult to satisfy the customer's requests since a long cycle time is required in prior art.

Inspections are performed on complete thin-film heads after the entire manufacturing steps are finished in prior art. As a result, even if nonconforming heads are produced during the manufacturing steps, it is impossible to eliminate them. It is therefore difficult to improve yields of complete products.

SUMMARY OF THE INVENTION

It is an object of the invention to provide a thin-film magnetic head and a method of manufacturing the same and a thin-film magnetic head sub-structure and a method of manufacturing the same for providing thin-film magnetic heads that meet the specifications required by the customer in a short time and for improving yields of thin-film magnetic heads.

A thin-film magnetic head of the invention comprises: a reproducing head including: a magnetoresistive element; a first shield layer and a second shield layer for shielding the magnetoresistive element, portions of the first shield layer and the second shield layer that face a recording medium being opposed to each other with the magnetoresistive element in between; a first insulating layer provided between the magnetoresistive element and the first shield layer and a second insulating layer provided between the magnetoresistive element and the second shield layer; and a recording head including: a first magnetic layer and a second magnetic layer magnetically coupled to each other and each made up of at least one layer and including magnetic pole portions opposed to each other and placed in regions on a side of ends of the magnetic layers facing toward a recording medium; a gap layer placed between the pole portions of the first and second magnetic layers; and a thin-film coil at least part of which is placed between the first and second magnetic layers and insulated from the first and second magnetic layers. The second shield layer includes a first portion placed in a plane the same as a plane in which the first shield layer is placed, the first portion being insulated from the first shield layer, and a second portion connected to the first portion and opposed to the first shield layer with the magnetoresistive element in between. The second shield layer also functions as the first magnetic layer. The at least part of the thin-film coil is placed between the first portion of the'second shield layer and the second magnetic layer.

According to the thin-film magnetic head of the invention, a thin-film magnetic head sub-structure comprising the first shield layer, the first portion of the second shield layer, and at least part of the thin-film coil may be manufactured. In response to the customer's requests, the second portion of the second shield layer, the magnetoresistive element, and the second magnetic layer may be formed on the sub-structure.

The thin-film magnetic head may further comprise a conductive layer connected to the magnetoresistive element. The at least part of the conductive layer is placed between the first shield layer and the first portion of the second shield layer, being insulated from the first shield layer and the first portion. In this case the head may further comprise a shield layer for shielding the at least part of the conductive layer.

A method of manufacturing a thin-film magnetic head, and a thin-film magnetic head sub-structure and a method of manufacturing the same of the invention are used for manufacturing a thin-film magnetic head comprising a reproducing head and a recording head. In the head the reproducing head includes: a magnetoresistive element; a first shield layer and a second shield layer for shielding the magnetoresistive element, portions of the first shield layer and the second shield layer that face a recording medium being opposed to each other with the magnetoresistive element in between; a first insulating layer provided between the magnetoresistive element and the first shield layer and a second insulating layer provided between the magnetoresistive element and the second shield layer. The recording head includes: a first magnetic layer and a second magnetic layer magnetically coupled to each other and each made up of at least one layer and including magnetic pole portions opposed to each other and placed in regions on a side of ends of the magnetic layers facing toward a recording medium; a gap layer placed between the pole portions of the first and second magnetic layers; and a thin-film coil at least part of which is placed between the first and second magnetic layers and insulated from the first and second magnetic layers. In the head the second shield layer includes a first portion placed in a plane the same as a plane in which the first shield layer is placed, the first portion being insulated from the first shield layer, and a second portion connected to the first portion and opposed to the first shield layer with the magnetoresistive element in between. The second shield layer also functions as the first magnetic layer.

The method of manufacturing a thin-film magnetic head of the invention includes the steps of: forming the first shield layer and the first portion of the second shield layer to be placed in one plane and insulated from each other; forming at least part of the thin-film coil on the first portion of the second shield layer such that the coil is insulated from the first portion; forming the first insulating layer on the first shield layer; forming the magnetoresistive element on the first insulating layer; forming the second insulating layer on the magnetoresistive element; forming the second portion of the second shield layer on the second insulating layer; forming the gap layer on the second portion; and forming the second magnetic layer on the gap layer.

According to the method, a thin-film magnetic head sub-structure comprising the first shield layer, the first portion of the second shield layer, and at least part of the thin-film coil may be manufactured. In response to the customer's requests, the second portion of the second shield layer, the magnetoresistive element, and the second magnetic layer may be formed on the sub-structure.

The method may further include the step of forming at least part of a conductive layer to be connected to the magnetoresistive element such that the at least part of the conductive layer is placed between the first shield layer and the first portion of the second shield layer, being insulated from the first shield layer and the first portion. In this case the method may further include the step of forming a shield layer for shielding the at least part of the conductive layer. A shield layer for shielding the at least part of the conductive layer may be formed at the same time in the step of forming the second magnetic layer. The at least part of the conductive layer and the at least part of the thin-film coil may be formed in one step. The at least part of the conductive layer may be formed by plating.

In the method the first shield layer and the first portion of the second shield layer may be formed by plating.

The thin-film magnetic head sub-structure comprises: the first shield layer; the first portion of the second shield layer placed in the same plane as the first shield layer, being insulated from the first shield layer; and at least part of the thin-film coil placed on the first portion of the second shield layer, being insulated from the first portion.

According to the thin-film magnetic head sub-structure of the invention, in response to the customer's requests, the second portion of the second shield layer, the magnetoresistive element, and the second magnetic layer may be formed on the sub-structure to manufacture a thin-film magnetic head.

The thin-film magnetic head sub-structure may further comprise at least part of a conductive layer to be connected to the magnetoresistive element. The at least part of the conductive layer is placed between the first shield layer and the first portion of the second shield layer, being insulated from the first shield layer and the first portion.

The method of manufacturing a thin-film magnetic head sub-structure includes the steps of: forming the first shield layer and the first portion of the second shield layer to be placed in one plane and insulated from each other; and forming at least part of the thin-film coil on the first portion of the second shield layer such that the coil is insulated from the first portion.

According to the method of manufacturing a thin-film magnetic head sub-structure of the invention, the thin-film magnetic head material comprising the first shield layer, the first portion of the second shield layer, and at least part of the thin-film coil may be manufactured. In response to the customer's requests, the second portion of the second shield layer, the magnetoresistive element, and the second magnetic layer may be formed on the sub-structure to manufacture a thin-film magnetic head.

The method may further include the step of forming at least part of a conductive layer to be connected to the magnetoresistive element such that the at least part of the conductive layer is placed between the first shield layer and the first portion of the second shield layer, being insulated from the first shield layer and the first portion. In this case the at least part of the conductive layer and the at least part of the thin-film coil may be formed in one step. The at least part of the conductive layer may be formed by plating.

In the method the first shield layer and the first portion of the second shield layer may be formed by plating.

Other and further objects, features and advantages of the invention will appear more fully from the following description.

BRIEF DESCRIPTION OF THE DRAWINGS

FIG. 4A and FIG. 4B are cross sections for illustrating a step that follows FIG. 3A and FIG. 3B;

FIG. 5A and FIG. 5B are cross sections for illustrating a step that follows FIG. 4A and FIG. 4B;

FIG. 15A and FIG. 15B are cross sections for illustrating a step in a method of manufacturing a thin-film magnetic head of a related art;

FIG. 16A and FIG. 16B are cross sections for illustrating a step that follows FIG. 15A and FIG. 15B;

FIG. 17A and FIG. 17B are cross sections for illustrating a step that follows FIG. 16A and FIG. 16B;

FIG. 18A and FIG. 18B are cross sections for illustrating a step that follows FIG. 17A and FIG. 17B;

FIG. 19A and FIG. 19B are cross sections for illustrating a step that follows FIG. 18A and FIG. 18B;

FIG. 20A and FIG. 20B are cross sections for illustrating a step that follows FIG. 19A and FIG. 19B;

FIG. 21A and FIG. 21B are cross sections for illustrating a step that follows FIG. 20A and FIG. 20B;

FIG. 22A and FIG. 22B are cross sections for illustrating a step that follows FIG. 21A and FIG. 21B;

FIG. 23A and FIG. 23B are cross sections of the related-art thin-film magnetic head;

FIG. 24 is a cross section of the related-art thin-film magnetic head orthogonal to the air bearing surface;

DETAILED DESCRIPTION OF PREFERRED EMBODIMENTS

Preferred embodiment of the invention will now be described in detail with reference to the accompanying drawings.

First Embodiment

Reference is now made to FIG. 1A to FIG. 6A, FIG. 1B to FIG. 6B, FIG. 7 and FIG. 8 to describe a composite thin-film magnetic head and a method of manufacturing the same of a first embodiment of the invention. FIG. 1A to FIG. 6A are cross sections each orthogonal to the air bearing surface of the thin-film magnetic head. FIG. 1B to FIG. 6B are cross sections of the pole portion of the head parallel to the air bearing surface. The following description applies to a magnetic head sub-structure and a method of manufacturing the same of the first embodiment, too.

Figures 1A, 1B:
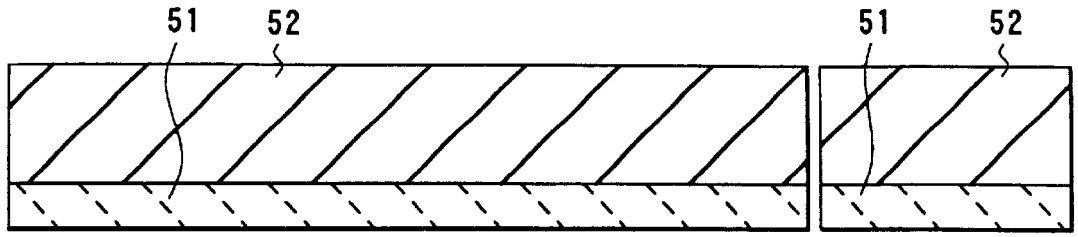
FIG. 1A and FIG. 1B are cross sections for illustrating a step in a method of manufacturing a thin-film magnetic head of a first embodiment of the invention.

In the method of the embodiment, as shown in FIG. 1A and FIG. 1B, an insulating layer 52 made of alumina ($Al_2O_3$), for example, of about 5 to 10 $\mu$m in thickness is deposited on a substrate 51 made of aluminum oxide and titanium carbide ($Al_2O_3$—TiC), for example.

Although not shown, a seed layer is made on the insulating layer 52 through sputtering Permalloy (NiFe). The seed layer is used for forming a bottom shield layer and part of a top shield layer-cum-bottom pole layer (called top shield layer in the following description) through plating.

Figures 2A, 2B:
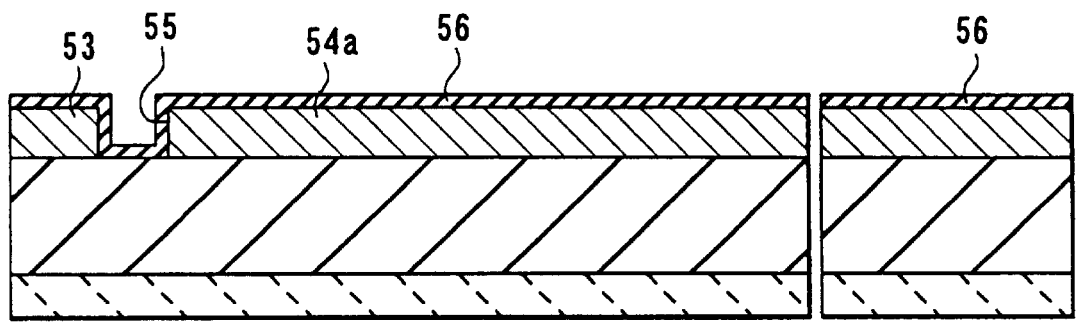
FIG. 2A and FIG. 2B are cross sections for illustrating a step that follows FIG. 1A and FIG. 1B.

Next, as shown in FIG. 2A and FIG. 2B, on the seed layer a magnetic material such as Permalloy (NiFe) is selectively deposited to a thickness of about 2 to 3 $\mu$m through plating with a photoresist film as a mask. A bottom shield layer 53 for the reproducing head and a portion (called a first portion in the following description) 54a of a top shield layer are thereby formed. Alternatively, the bottom shield layer 53 and the first portion 54a may be formed by sputtering a magnetic material and pattering the material through photolithography. The bottom shield layer 53 and the first portion 54a are formed in one plane, being insulated from each other by the photoresist. Between the bottom shield layer 53 and the first portion 54a, a pair of grooves 55 are formed in which at least portions of conductive layers to be connected to an MR element are placed. The bottom shield layer 53 corresponds to a first shield layer of the invention. The top shield layer corresponds to a second shield layer of the invention.

Next, part of the seed layer that covers the grooves 55 is selectively etched and removed. An insulating film 56 of alumina, for example, whose thickness is about 0.5 to 1 μm is formed through sputtering, for example, on the bottom shield layer 53 and the first portion 54a of the top shield layer including inside the grooves 55.

Figures 3A, 3B:
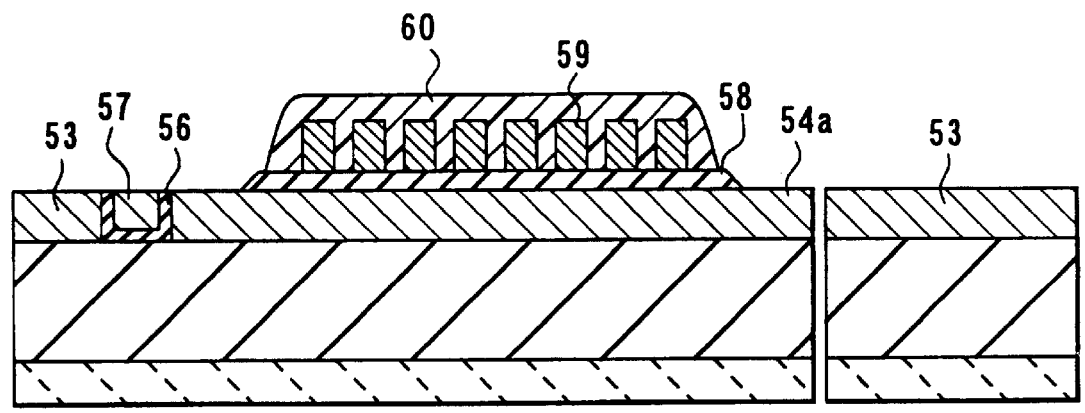
FIG. 3A and FIG. 3B are cross sections for illustrating a step that follows FIG. 2A and FIG. 2B.

Next, as shown in FIG. 3A and FIG. 3B, a pair of conductive layers 57 are made of copper, for example, in the grooves 55 covered with the insulating film 56. The conductive layers 57 make up leads connected to the MR element. The conductive layers 57 may be formed by depositing copper to a thickness of about 3 μm through plating selectively in the grooves 55 with a photoresist film as a mask. Alternatively, the conductive layers 57 may be formed through sputtering.

Next, an insulating layer having a thickness of 2 to 3 μm and made of alumina or silicon dioxide, for example, is formed on the entire surface. The insulating layer is then polished to the surfaces of the bottom shield layer 53, the first portion 54a of the top shield layer and the conductive layers 57 and flattened. The polishing method may be mechanical polishing or CMP. Through this flattening process, the surfaces of the bottom shield layer 53, the first portion 54a and the conductive layers 57 are exposed.

As thus described, the conductive layers 57 are formed through plating and precisely embedded in the grooves 55 between the bottom shield layer 53 and the first portion 54a of the top shield layer, the grooves 55 being fully covered with the insulating film 56 of 500 nm or above in thickness. As a result, an extremely high insulation property is obtained between the conductive layers 57 and the bottom shield layer 53 and the first portion 54a. It is therefore possible to prevent magnetic and electrical insulation faults between the conductive layers 57 and the bottom shield layer 53 and the first portion 54a due to particles or pinholes in the layers.

Next, an insulating film of alumina or silicon dioxide having a thickness of 0.5 to 1 μm is formed on the first portion 54a of the top shield layer. The insulating film is selectively etched through photolithography to form an insulating layer 58. The edge of the insulating layer 58 close to the pole portion is tapered. Next, a thin-film coil 59 for the recording head is made of copper, for example, through plating, for example, on the insulating layer 58. An insulating layer 60 of photoresist is formed into a specific pattern on the insulating layer 58 and the coil 59. The entire structure is then cured at a temperature of about 200° C.

The manufacturing steps taken to reach the state shown in FIG. 3A and FIG. 3B may be changed to a modification example as follows. In the state shown in FIG. 2A and FIG. 2B, the coil 59 is formed on the insulating film 56 and the conductive layers 57 are formed in the grooves 55 covered with the insulating film 56. The coil 59 and the conductive layers 57 are made of the same material and formed in the same step. Next, on the insulating film 56 and the coil 59, the insulating layer 60 of photoresist is formed into a specific pattern. The insulating film 56 is then patterned through the use of the insulating layer 60 as a mask to reach the state shown in FIG. 3A and FIG. 3B. In this case the insulating film 56 replaces the insulating layer 58 shown in FIG. 3A and FIG. 3B. The number of manufacturing steps are greatly reduced in this modification example.

The intermediate product in the state shown in FIG. 3A and FIG. 3B is a thin-film magnetic head sub-structure of the embodiment. The intermediate product comprises the bottom shield layer 53, the first portion 54a of the top shield layer, and the thin-film coil 59.

Following the state shown in FIG. 3A and FIG. 3B, as shown in FIG. 4A and FIG. 4B, an insulating material such as aluminum nitride or alumina is sputtered to tens of nanometers over the entire surface to form a bottom shield gap film 61a as an insulating layer. Before forming the bottom shield gap film 61a, a photoresist pattern in a T-shape, for example, is formed to facilitate liftoff where contact holes are to be formed for electrically connecting the conductive layers 57 to other conductive layers described later. After the bottom shield gap film 61a is formed, the contact holes are formed through lifting off the photoresist pattern. Alternatively, the contact holes may be formed by selectively etching the bottom shield gap film 61a through the use of photolithography.

Next, an MR film of tens of nanometers in thickness for forming an MR element 62 for reproduction is deposited through sputtering on the bottom shield gap film 61a. A photoresist pattern (not shown) is then selectively formed where the MR element 62 is to be formed on the MR film. The photoresist pattern may be T-shaped, for example, to facilitate liftoff. Next, the MR film is etched through argon-base ion milling, for example, with the photoresist pattern as a mask to form the MR element 62. The MR element 62 may be either a GMR element or an AMR element.

Next, on the bottom shield gap film 61a, a pair of conductive layers 63 of tens to hundreds of nanometers in thickness are formed through sputtering with the same photoresist pattern as a mask. The conductive layers 63 are to be electrically connected to the MR element 62. The conductive layers 63 may be formed through stacking TiW, CoPt, TiW, Ta, and Au, for example. The conductive layers 63 are electrically connected to the conductive layers 57 through the contact holes provided in the bottom shield gap film 61a. The conductive layers 63 and 57 make up the leads connected to the MR element 62.

Next, an insulating material such as aluminum nitride or alumina is sputtered to a thickness of tens of nanometers to form a top shield gap film 61b as an insulating layer. The MR element 62 is thus embedded in the shield gap films 61a and 61b. Next, the shield gap films 61a and 61b are selectively removed through dry etching with a photoresist pattern as a mask. A contact hole is thereby formed for connecting the first portion 54a to a second portion described later of the top shield layer. Another contact hole is thereby formed for making a magnetic path behind the coil 59 (that is, the right side of FIG. 4A).

Next, as shown in FIG. 5A and FIG. 5B, a second portion 54b of the top shield layer is formed on the side of the pole portion. The second portion 54b is made of a magnetic material and has a thickness of about 3.5 μm, for example, and is connected to the first portion 54a of the top shield layer. The second portion 54b is placed to face the bottom shield layer 53 with the MR element 62 in between. At the same time, a magnetic layer 64 for making the magnetic path is formed in the contact hole for making the magnetic path behind the thin-film coil 59. The magnetic layer 64 is made of a magnetic material and has a thickness of about 3.5 μm, for example. The second portion 54a of the top shield layer and the magnetic layer 64 are formed through plating, for example.

The bottom shield layer 53 and the top shield layer 54a and 54b may be made of NiFe (80 weight % Ni and 20 weight % Fe) or a high saturation flux density material such as NiFe (50 weight % Ni and 50 weight % Fe), Sendust, FeN or a compound thereof, or an amorphous of Fe—Co—Zr. The bottom shield layer 53 and the top shield layer 54a and 54b may be made of layers of two or more of those materials. Through the use of a high saturation flux density material for the bottom shield layer 53 and the top shield layer 54a and 54b, it is possible to reduce the effects of noises on the MR element 62 caused by internal factors such as magnetism generated by the coil of the induction-type recording head or external factors such as the motor of the hard disk drive. A precise reproducing output is therefore achieved and a highly sensitive reproducing head is obtained.

Figures 6A, 6B:
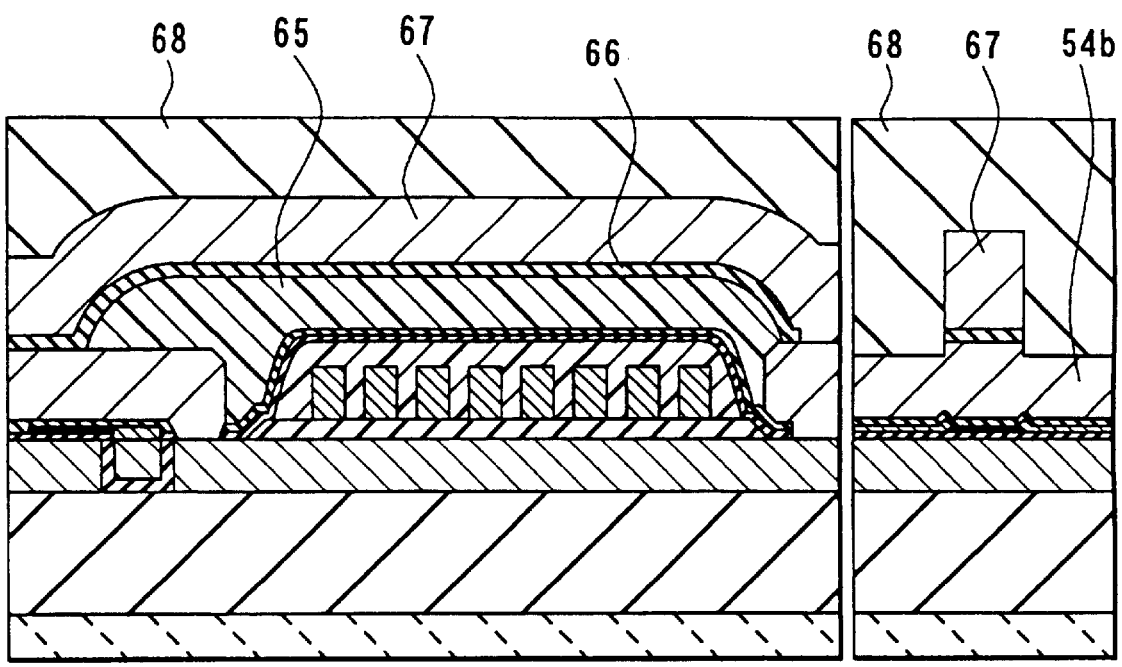
FIG. 6A and FIG. 6B are cross sections of the thin-film magnetic head of the first embodiment of the invention.

Next, as shown in FIG. 6A and FIG. 6B, an insulating layer 65 of photoresist is formed into a specific pattern over the coil 59. The entire structure is then cured at a temperature of about 200° C. The throat height is defined by the insulating layer 65 in the embodiment. Next, a recording gap layer 66 having a thickness of about 300 nm and made of an insulating film of alumina, aluminum nitride, or silicon dioxide, for example, is formed on the entire surface. The recording gap layer 66 on the top surface of the magnetic layer 64 is then partially etched to form a contact hole for making the magnetic path.

Next, a top pole layer 67 of about 3 to 4 μm in thickness is formed on the recording gap layer 66. The top pole layer 67 determines the track width of the induction recording head. The top pole layer 67 may be formed through plating with NiFe (50 weight % Ni and 50 weight % Fe), or through sputtering a high saturation flux density material such as FeN or a compound thereof and then patterning. Besides the above examples, the material of the top pole layer 67 may be NiFe (80 weight % Ni and 20 weight % Fe) or a high saturation flux density material such as an amorphous of Fe—Co—Zr. Alternatively, the top pole layer 67 may be layers of two or more of the above materials. The top pole layer 67 made of a high saturation flux density material allows the magnetic flux generated by the coil 59 to effectively reach the pole portion without saturating before reaching the pole. An efficient recording head is therefore obtained.

Next, portions of the recording gap layer 66 on both sides of the top pole layer 67 are removed through dry etching. The exposed second portion 54b of the top shield layer is then etched through ion milling by about 0.5 μm, for example, with the top pole layer 67 as a mask so as to form a trim structure.

Next, an overcoat layer 68 of alumina, for example, whose thickness is about 30 to 40 μm is formed to cover the top pole layer 67. Finally, machine processing of the slider is performed and the air bearing surface of the recording head and the reproducing head is formed. The thin-film magnetic head is thus completed.

The top shield layer (bottom pole layer) 54a and 54b, the magnetic layer 64, the top pole layer 67, and the thin-film coil 59 correspond to a recording head of the invention. That is, the top shield layer (bottom pole layer) 54a and 54b and the magnetic layer 64 correspond to a first magnetic layer of the invention. The top pole layer 67 corresponds to a second magnetic layer.

Figure 7:
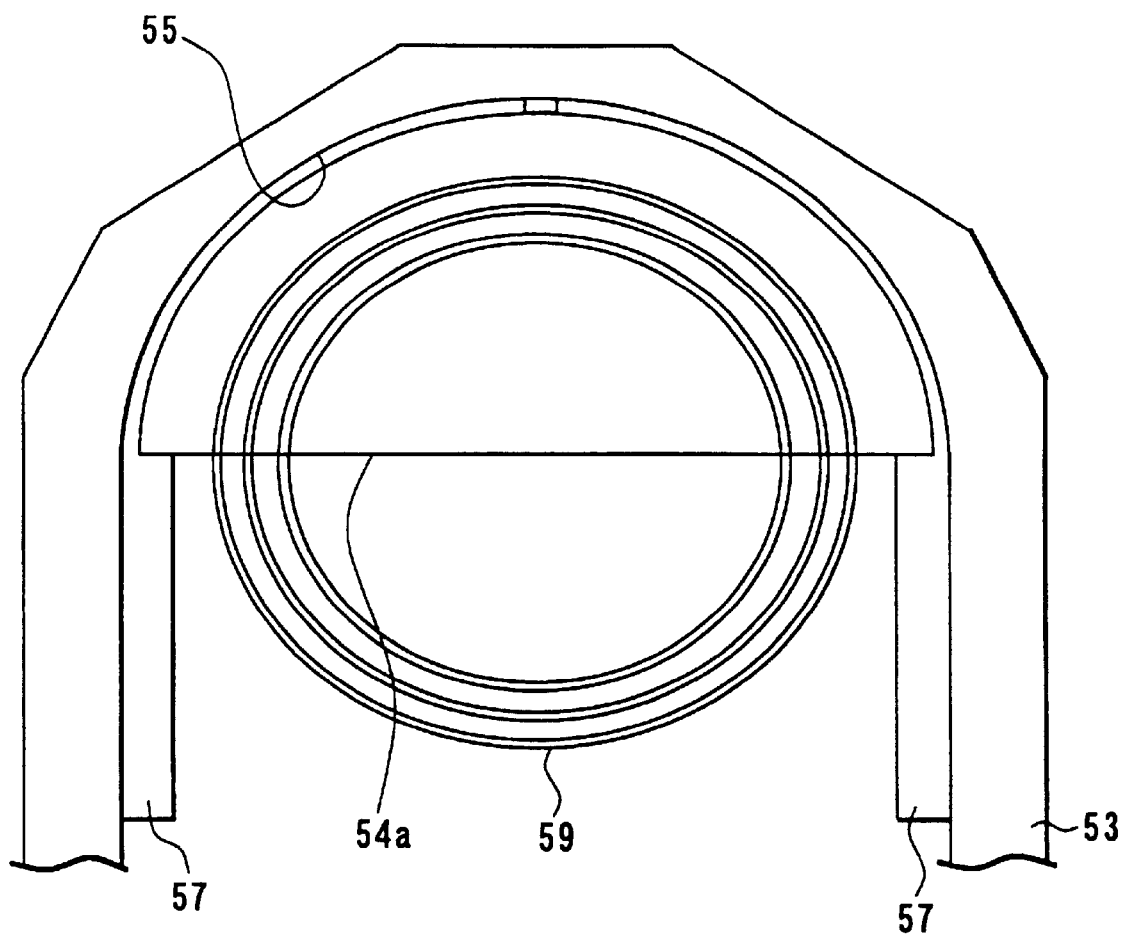
FIG. 7 is a top view of the thin-film magnetic head of the first embodiment in the state in one of the manufacturing steps.
Figure 8:
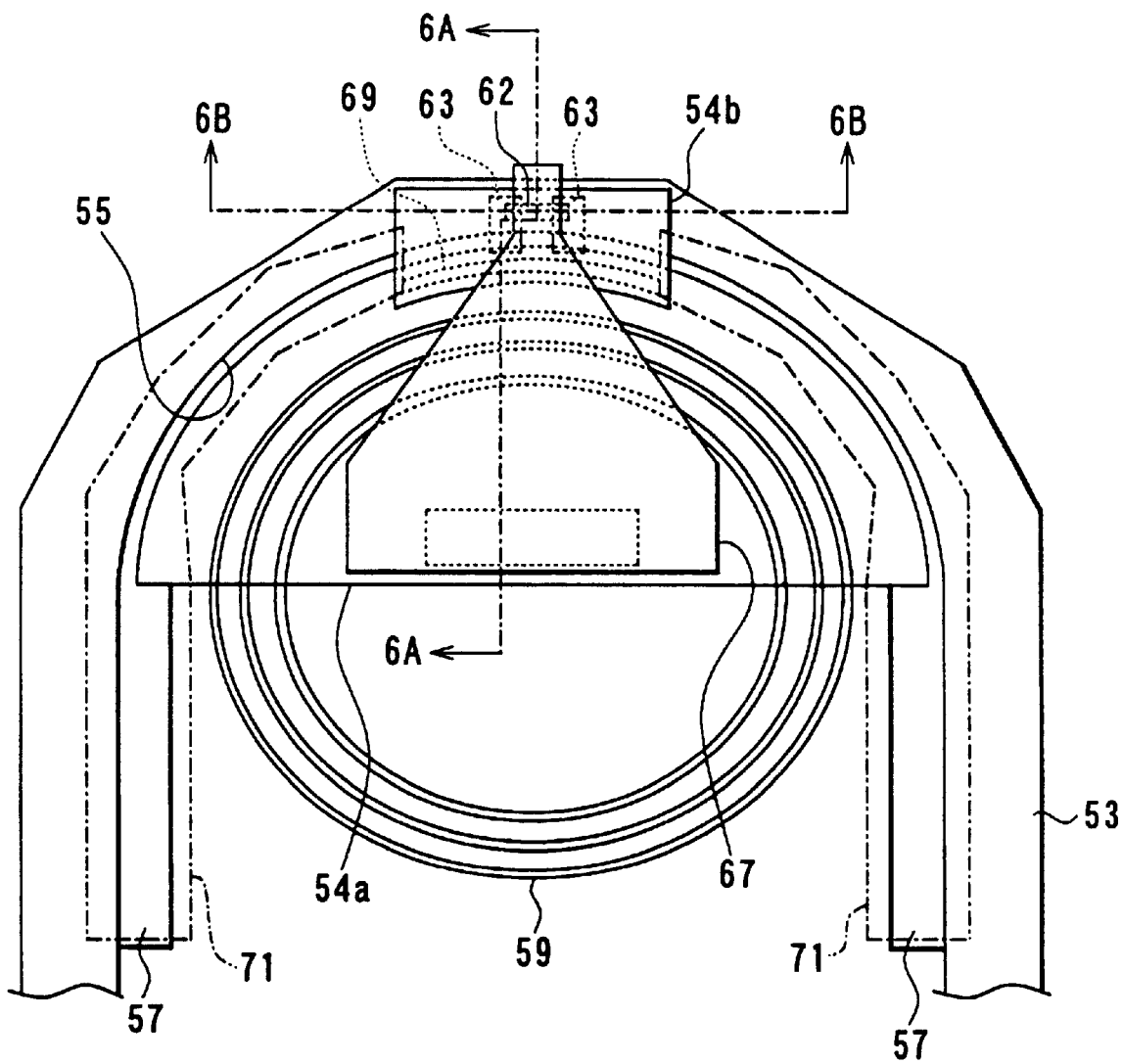
FIG. 8 is a top view of the thin-film magnetic head of the first embodiment.

FIG. 7 is a top view of the thin-film magnetic head of the embodiment manufactured through the foregoing process in the state in one of the manufacturing steps. FIG. 8 is a top view of the thin-film magnetic head of the embodiment manufactured through the foregoing process. FIG. 7 corresponds to the state shown in FIG. 3A and FIG. 3B. In FIG. 8 the overcoat layer 68 is omitted. FIG. 8 shows the state before mechanical processing of the slider is performed. Numeral 69 of FIG. 8 indicates the contact hole for connecting the second portion 54b to the first portion 54a of the top shield layer. FIG. 1A to FIG. 6A are cross sections taken along line 6A—6A of FIG. 8. FIG. 1B to FIG. 6B are cross sections taken along line 6B—6B of FIG. 8.

In this embodiment, as shown in FIG. 8, shield layers 71 may be provided for shielding at least portions of the conductive layers 57. The shield layers 71 cover portions of the conductive layers 57 that do not face the second portion 54b of the top shield layer. In the step of forming the top pole layer 67, for example, the shield layers 71 may be made of the same material as the top pole layer 67 at the same time.

In the embodiment the bottom shield layer 53 and the first portion 54a of the top shield layer are placed in one plane, being insulated from each other. The portions of the conductive layers 57 making up the leads connected to the MR element 62 are placed in the grooves 55 provided between the bottom shield layer 53 and the first portion 54a, being insulated by the insulating film 56 from the bottom shield layer 53 and the first portion 54a.

Many customers of thin-film magnetic heads order the track width of a reproducing head and the throat height and the track width of a recording head that suit their own products. However, if thin-film magnetic heads that meet the specifications a customer requires are manufactured after an order is received, it is difficult to supply the products in a short time after the receipt of the order.

According to the embodiment, as shown in FIG. 3A and FIG. 3B, the thin-film magnetic head sub-structure commonly used for thin-film magnetic heads is completed in the step of forming the thin-film coil 59 (that is, forming the insulating layer 60 in the embodiment). It takes a relatively short time to perform the steps that follow the formation of the thin-film magnetic head sub-structure. In addition, it is possible to inspect the thin-film magnetic head sub-structures and eliminate nonconforming ones.

Therefore, according to the embodiment, the intermediate product, that is, the thin-film magnetic head sub-structure, having gone through the manufacturing steps as far as the step of forming the coil 59 may be mass-produced so that many intermediate products in stock are obtained. Such intermediate products in stock may be increased so that they are plentiful enough to be supplied to customers. The specifications of the thin-film magnetic heads may be then determined to meet different customers' demands. Therefore, the embodiment allows the appropriate number of intermediate products in stock to be obtained. Such intermediate products have gone through 50 to 60 percent of the entire manufacturing steps and many of them have passed an inspection as conforming products. It is therefore possible to produce thin-film magnetic heads that meet the specifications required by the customer in a short time after receipt of an order. As a result, the cycle time from receipt of a customer's order to completion and shipment of thin-film magnetic heads may be two weeks or less, according to the embodiment, which is shorter than twenty to forty days required in prior-art.

According to the embodiment, nonconforming intermediate products have been already eliminated so that it is possible to make conforming intermediate products into complete products as soon as possible in response to customers' demands. High quality of the products that is not obtained by prior-art techniques is therefore achieved and the yields of the finished products improve.

According to the embodiment, it is possible to comply with the customer's demand immediately even if it is changed in a short time. It is therefore possible to prevent products from being wasted.

According to the embodiment, intermediate products may be inspected so that it is not necessary to perform the manufacturing steps that follow on nonconforming products. As a result, manufacturing costs of the thin-film magnetic heads are reduced, compared to prior art.

According to the embodiment, inspections may be performed on both intermediate products and complete thin-film magnetic heads. Extremely high-quality products are thereby assured.

According to the embodiment, inspections may be performed on both intermediate products and complete thin-film magnetic heads. As a result, it is easy to detect a manufacturing step with a problem and to immediately improve such a step. id It is thereby possible to prevent a more serious problem.

According to the embodiment, the MR element 62 is formed after the coil 59 is formed. It is therefore possible to prevent a reduction in the property of the MR element 62 due to the influence of heat treatment performed on the photoresist when the coil is formed and the influence of water thereby generated and so on. This preventing effect is particularly effective when the MR element 62 is a sensitive GMR element.

According to the embodiment, the number of manufacturing steps that follow the formation of the MR element 62 is reduced, compared to prior-art methods. It is therefore possible to greatly reduce breakage such as static damage of the MR element 62 caused by handling and so on. This effect is particularly remarkable when the MR element 62 is a GMR element made of layers of a plurality of extremely thin (about 1 to 5 nm) films.

In the embodiment the bottom shield layer 53 and the first portion 54a of the top shield layer are placed in one plane, being insulated from each other. The portions of the conductive layers 57 making up the leads connected to the MR element 62 are placed in the grooves 55 provided between the bottom shield layer 53 and the first portion 54a, being insulated by the insulating film 56 from the bottom shield layer 53 and the first portion 54a. As a result, according to the embodiment, an extremely high insulation property is achieved between the conductive layers 57 and the bottom shield layer 53 and the first portion 54a of the top shield layer. Although part of the conductive layers 57 faces the second portion 54b of the top shield layer with the bottom shield gap film 61a and the top shield gap film 61b in between, the most part of the conductive layers 57 does not face the top shield layer 54a and 54b. An extremely high insulation property is therefore achieved between the conductive layers 57 and the top shield layer 54a and 54b.

According to the embodiment as thus described, an extremely high insulation property is achieved between the conductive layers 57 and the bottom shield layer 53 and the top shield layer 54a and 54b. It is therefore possible to prevent magnetic and electrical insulation faults between the conductive layers 57 and the bottom shield layer 53 and the top shield layer 54a and 54b.

According to the embodiment, the conductive layers 57 are not inserted between the bottom shield gap film 61a and the top shield gap film 61b. As a result, it is impossible that large areas of the conductive layers 57 face the bottom shield layer 53 and the top shield layer 54a and 54b with the bottom shield gap film 61a and the top shield gap film 61b in between. Therefore, although the bottom shield gap film 61a and the top shield gap film 61b are thin, the insulation property is maintained at a high level between the conductive layers 57 and the bottom shield layer 53 and between the conductive layers 57 and the top shield layer 54a and 54b.

According to the embodiment described so far, the insulation property is improved between the conductive layers connected to the MR element 62 and the bottom shield layer 53 and between the conductive layers and the top shield layer 54a and 54b without increasing the thickness of the bottom shield gap film 61a and the top shield gap film 61b.

According to the embodiment, the bottom shield gap film 61a and the top shield gap film 61b are made thin enough to improve the thermal asperity. The property of the reproducing head is thereby improved. The thermal asperity is a reduction in reproducing property due to self heat of the reproducing head during reproduction.

According to the embodiment, the conductive layers 57 are made thick enough so that the wiring resistance of the conductive layers connected to the MR element 62 is low. As a result, it is possible to detect with sensitivity a minute change in the output signal in response to a minute change in resistance of the MR element 62. The property of the reproducing head is improved in this respect, too.

In the embodiment, the lateral surfaces of the portions of the conductive layers 57 close to the MR element 62 and placed in the grooves 55 are shielded, being placed between the bottom shield layer 53 and the first portion 54a of the top shield layer. The top surfaces of the portions of the conductive layers 57 are shielded by the second portion 54b of the top shield layer. As a result, it is possible to reduce the effects of noises caused by internal factors such as magnetism generated by the coil of the induction-type recording head or external factors such as the motor of the hard disk drive. The property of the reproducing head is improved in this respect, too.

Since the shield layers 71 for the conductive layers are provided, it is possible to shield the top surfaces of the portions of the conductive layers 57 not facing the second portion 54b of the top shield layer. The effects of noises on the conductive layers 57 are thereby further reduced.

According to the embodiment, the thin-film coil 59 is placed between the first portion 54a of the top shield layer and the top pole layer 67 and on a side of the second portion 54b of the top shield layer in the direction parallel to the surfaces of the second portion 54b of the top shield layer. As a result, the height of the apex, that is, the hill-like rising coil portion, is reduced and the pole (the top pole layer 67) that defines the track width of the recording head is reduced in size. The recording density is thereby increased and the recording head property is improved.

According to the embodiment, the thick insulating layer 58 is provided between the coil 59 and the first portion 54a of the top shield layer that are opposed to each other. As a result, a high insulation strength is obtained between the coil 59 and the top shield layer 54a and 54b. It is also possible to reduce magnetic flux leakage from the coil 59.

According to the embodiment, the top pole layer of the recording head is not made up of two layers including a top pole tip and a top yoke layer but made of a single layer of the top pole layer 67. It is therefore impossible that the top yoke layer greater than the top pole tip in width is exposed in the air bearing surface. As a result, it is possible to prevent problems such as an increase in effective track width and writing data in a region other than the region where data is to be written on a recording medium.

According to the embodiment, there is no possibility of magnetic flux saturation that is generated in a contact portion between the top pole tip and the top yoke layer when the top pole layer is made up of two layers including the top pole tip and the top yoke layer. The writing properties such as magnetic flux rise time is therefore improved.

Second Embodiment

Figures 9A, 9B:
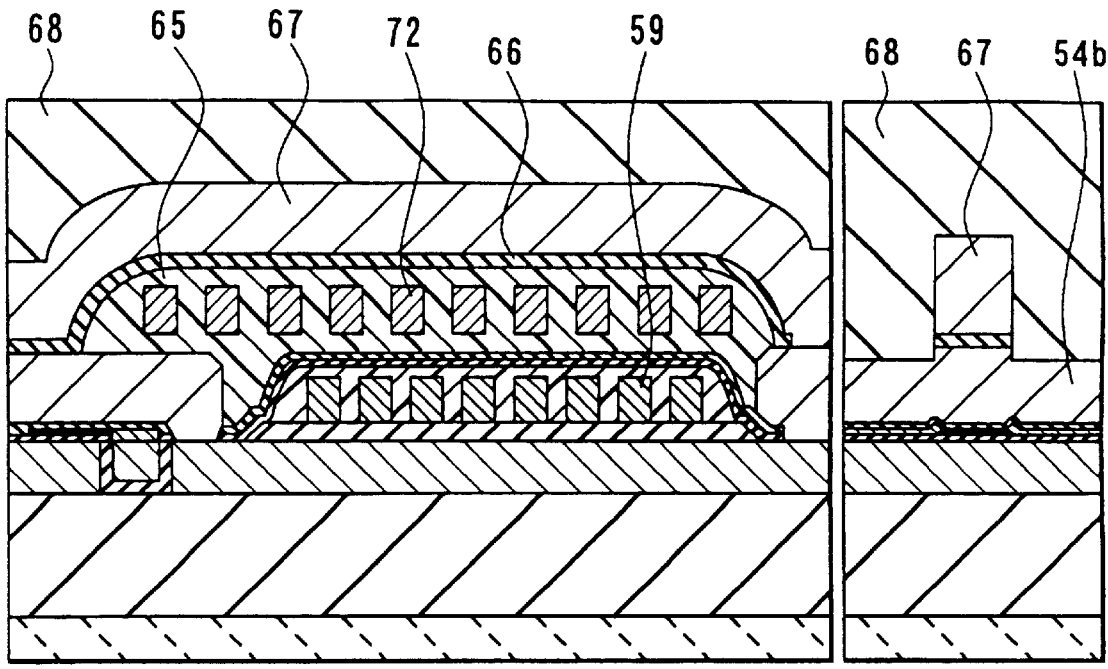
FIG. 9A and FIG. 9B are cross sections of a thin-film magnetic head of a second embodiment of the invention.

Reference is now made to FIG. 9A and FIG. 9B to describe a second embodiment of the invention. FIG. 9A is a cross section of a thin-film magnetic head orthogonal to the air bearing surface. FIG. 9B is a cross section of the pole portion of the thin-film magnetic head parallel to the air bearing surface. FIG. 9A shows the state before mechanical processing of the slider is performed.

In the thin-film magnetic head of the embodiment, a thin-film coil 72 of a second layer is formed in the insulating layer 65 made of photoresist of the thin-film magnetic head of the first embodiment. In this case, the insulating layer 65 of photoresist having a specific thickness is formed over the coil 59. The coil 72 is then formed through plating, for example. The insulating layer 65 is further formed to cover the coil 72. The throat height is defined by the insulating layer 65 in the embodiment.

The remainder of configuration, functions and effects of the embodiment are similar to those of the first embodiment.

Third Embodiment

Reference is now made to FIG. 10A to FIG. 12A, FIG. 10B to FIG. 12B, FIG. 13 and FIG. 14 to describe a composite thin-film magnetic head and a method of manufacturing the same of a third embodiment of the invention. FIG. 10A to FIG. 12A are cross sections of the thin-film magnetic head orthogonal to the air bearing surface. FIG. 10B to FIG. 12B are cross sections of the pole portion of the head parallel to the air bearing surface. The method of manufacturing the thin-film magnetic head of the embodiment is similar to that of the first embodiment as far as the step of forming the coil 59. The intermediate products having reached the step are mass-produced and gone through an inspection. An appropriate amount of conforming intermediate products are obtained.

Figures 10A, 10B:
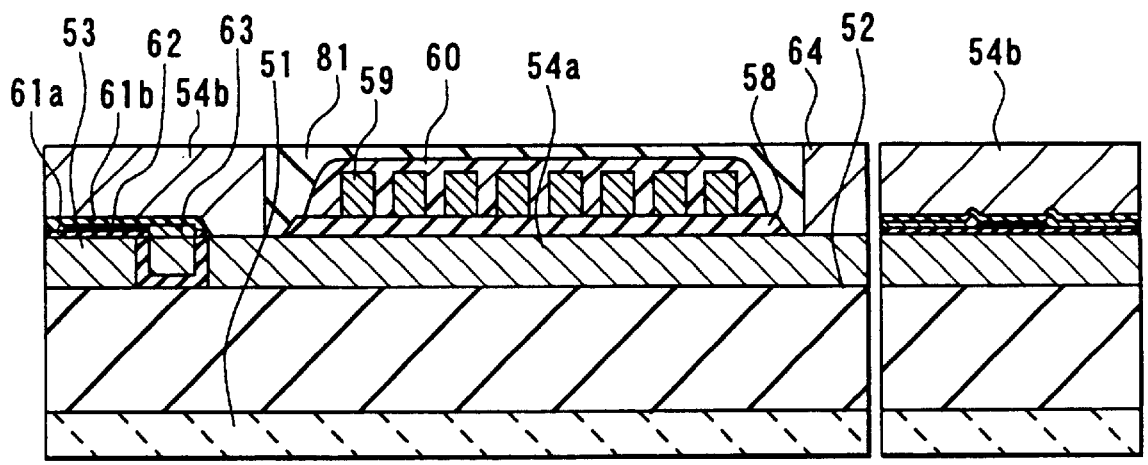
FIG. 10A and FIG. 10B are cross sections for illustrating a step in a method of manufacturing a thin-film magnetic head of a third embodiment of the invention.

In this embodiment, in order to complete the product to meet the customer's demands, the MR element (an AMR element or a GMR element, and so on) and the material of the shield gap film (alumina, aluminum nitride or boron nitride and so on) are selected and the track width of the reproducing head and the throat height and the track width of the recording head are determined in accordance with the customer's requests. As shown in FIG. 10A and FIG. 10B, the shield gap films 61a and 61b, the MR element 62 and the conductive layers 63 are then formed. Next, the second portion 54b of the top shield layer and the magnetic layer 64 are formed. An insulating layer 81 of alumina, for example, having a thickness of 3 to 4 μm is then formed over the entire surface. The entire surface is then polished through CMP, for example, so that the surfaces of the second portion 54b and the magnetic layer 64 are exposed.

Figures 11A, 11B:
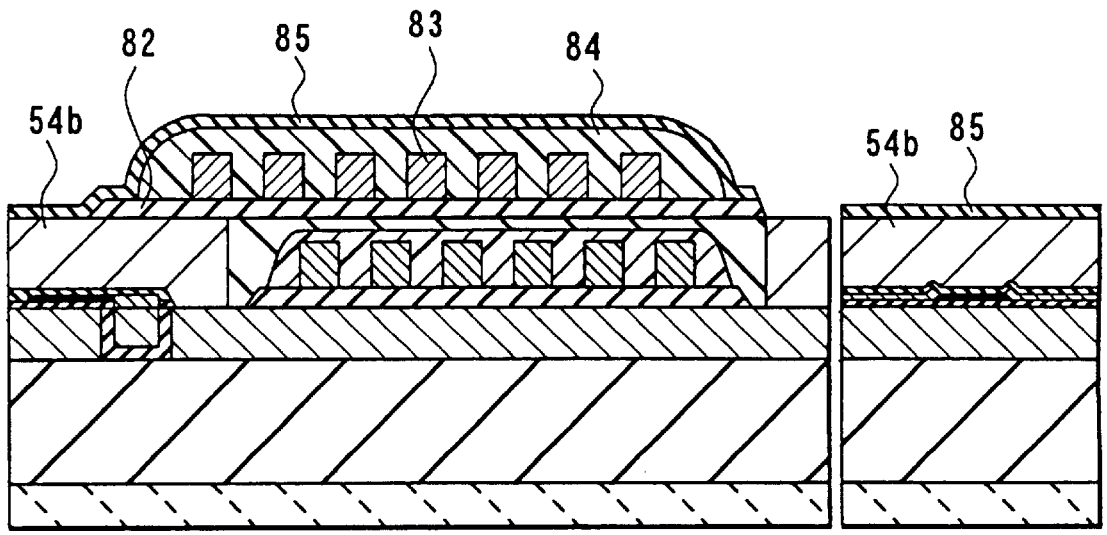
FIG. 11A and FIG. 11B are cross sections for illustrating a step that follows FIG. 10A and FIG. 10B.

Next, as shown in FIG. 11A and FIG. 11B, on the second portion 54b of the top shield layer and the insulating layer 81, an insulating layer 82 of alumina, for example, that defines the throat height of the recording head is formed. Next, a thin-film coil 83 of a second layer is formed on the insulating layer 82. An insulating layer 84 of photoresist is then formed into a specific pattern on the insulating layer 82 and the coil 83. Next, a recording gap layer 85 made of an insulating film of alumina, for example, is formed. The portion of the recording gap layer 85 on the magnetic layer 64 is then selectively removed to form a contact hole for making a magnetic path.

Figures 12A, 12B:
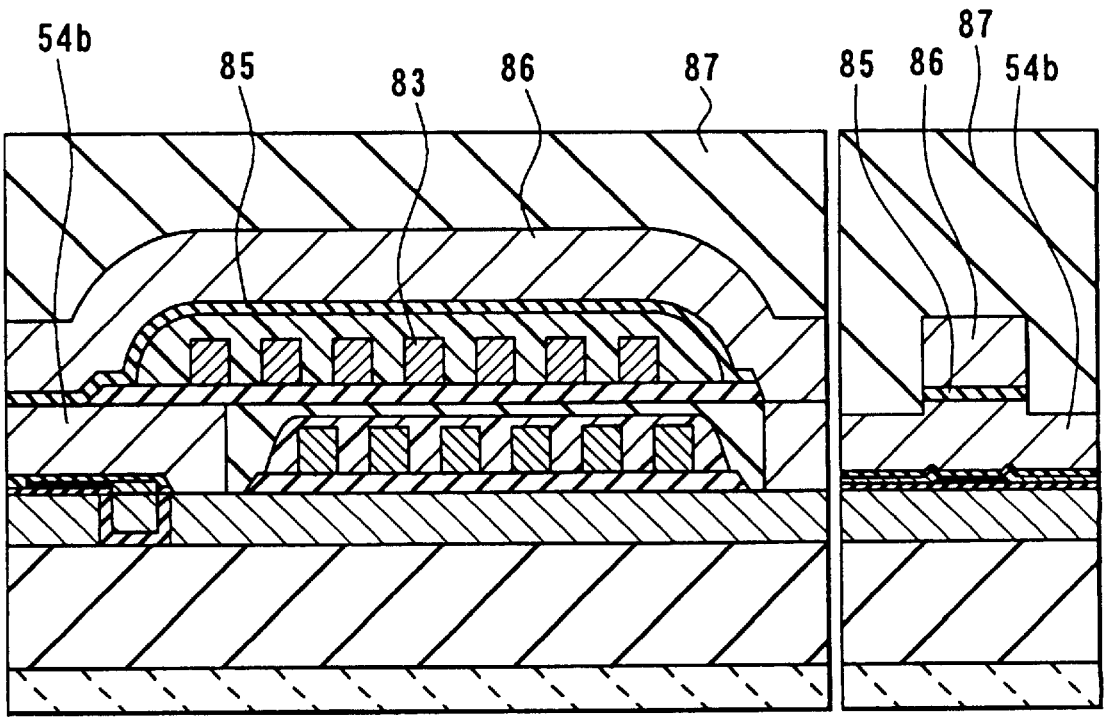
FIG. 12A and FIG. 12B are cross sections of the thin-film magnetic head of the third embodiment.

Next, as shown in FIG. 12A and FIG. 12B, a top pole layer 86 is formed on the recording gap layer 85. The top pole layer 86 defines the track width of the induction-type recording head. Next, the recording gap layer 85 on sides of the top pole layer 86 is removed through dry etching such as reactive ion etching. The exposed second portion 54b of the top shield layer is etched through ion milling, for example, with the top pole layer 86 as a mask. A trim structure is thereby formed.

Next, an overcoat layer 87 of alumina, for example, whose thickness is about 3 to 5 μm is formed to cover the top pole layer 86. Finally, machine processing of the slider is performed and the air bearing surface of the recording head and the reproducing head is formed. The thin-film magnetic head is thus completed.

Figure 13:
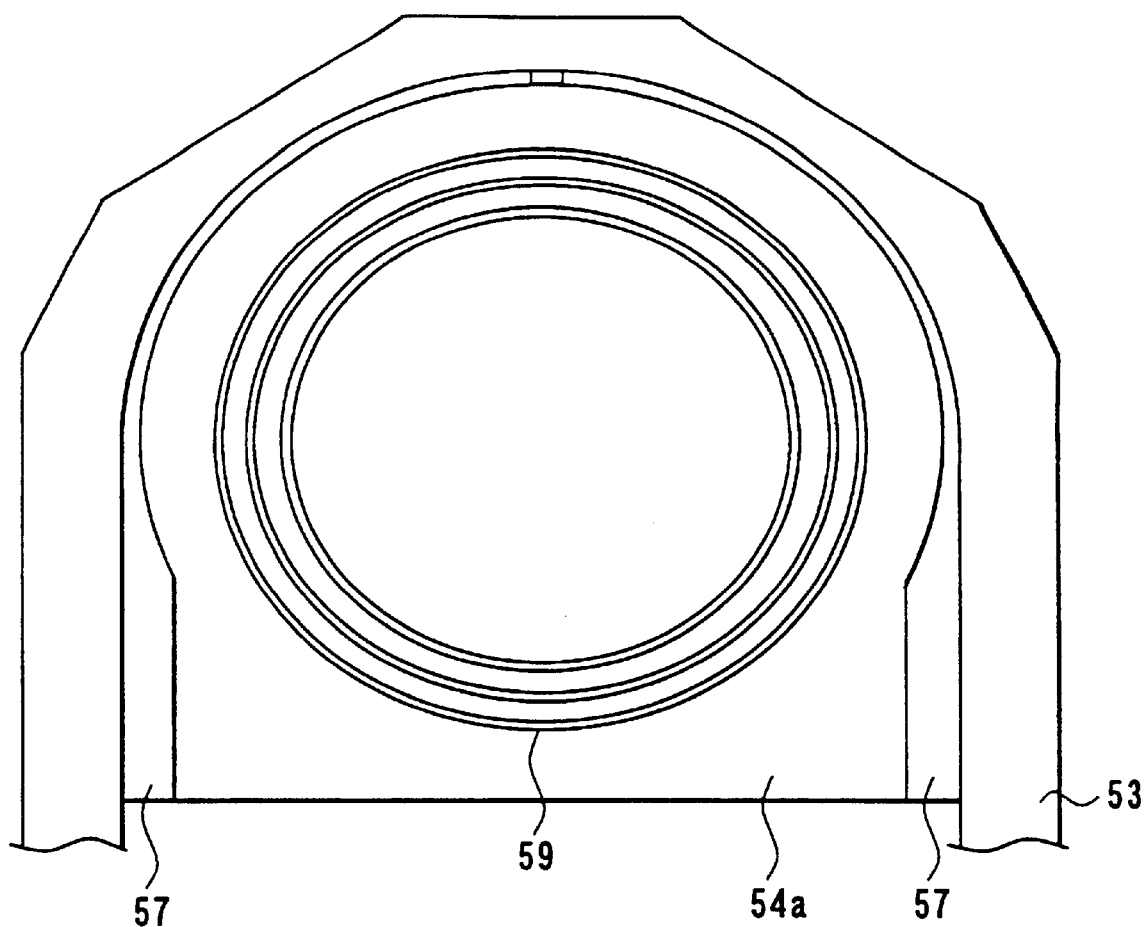
FIG. 13 is a top view of the thin-film magnetic head of the third embodiment in the state in one of the manufacturing steps.
Figure 14:
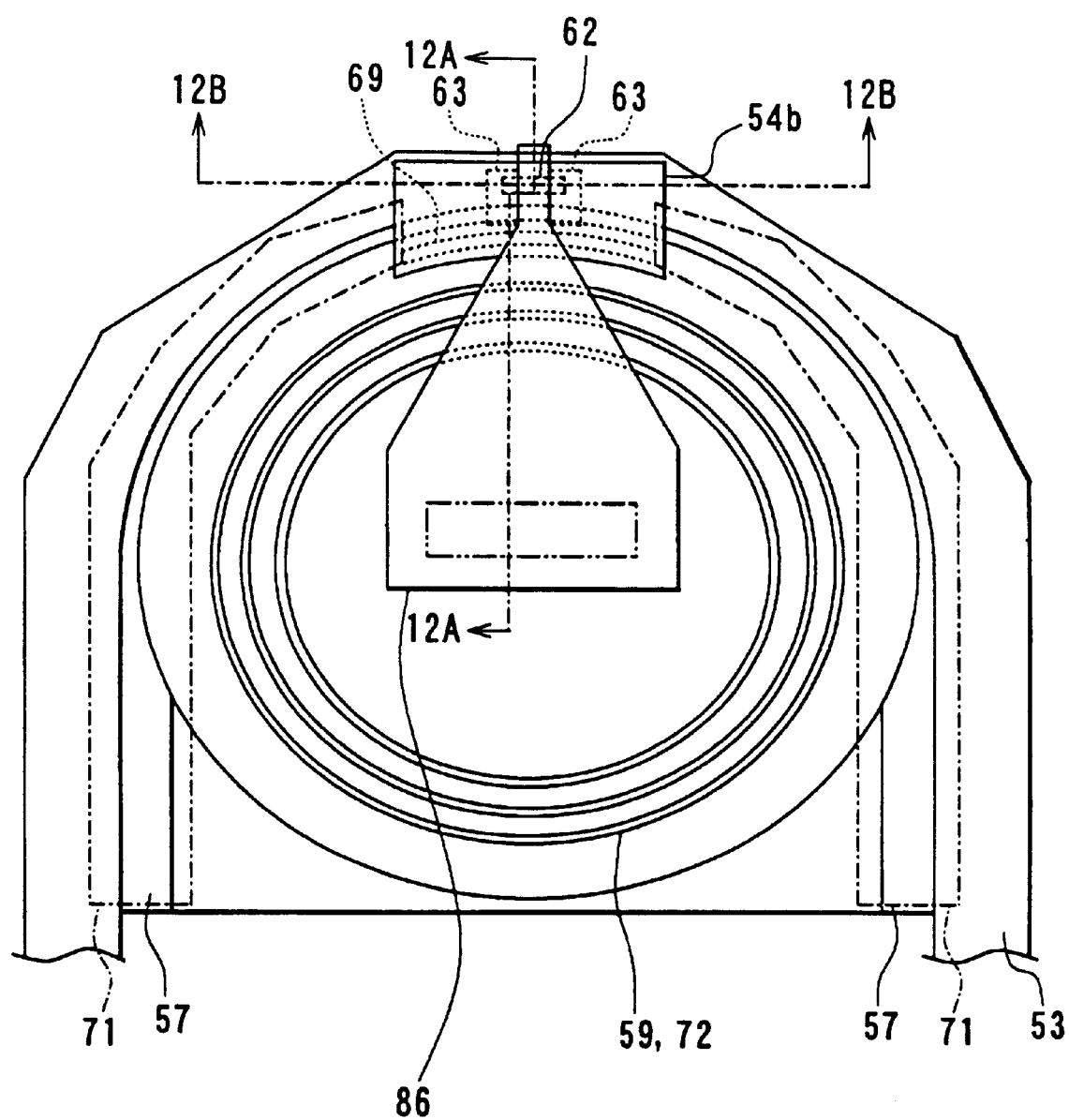
FIG. 14 is a top view of the thin-film magnetic head of the third embodiment.
Figure 25:
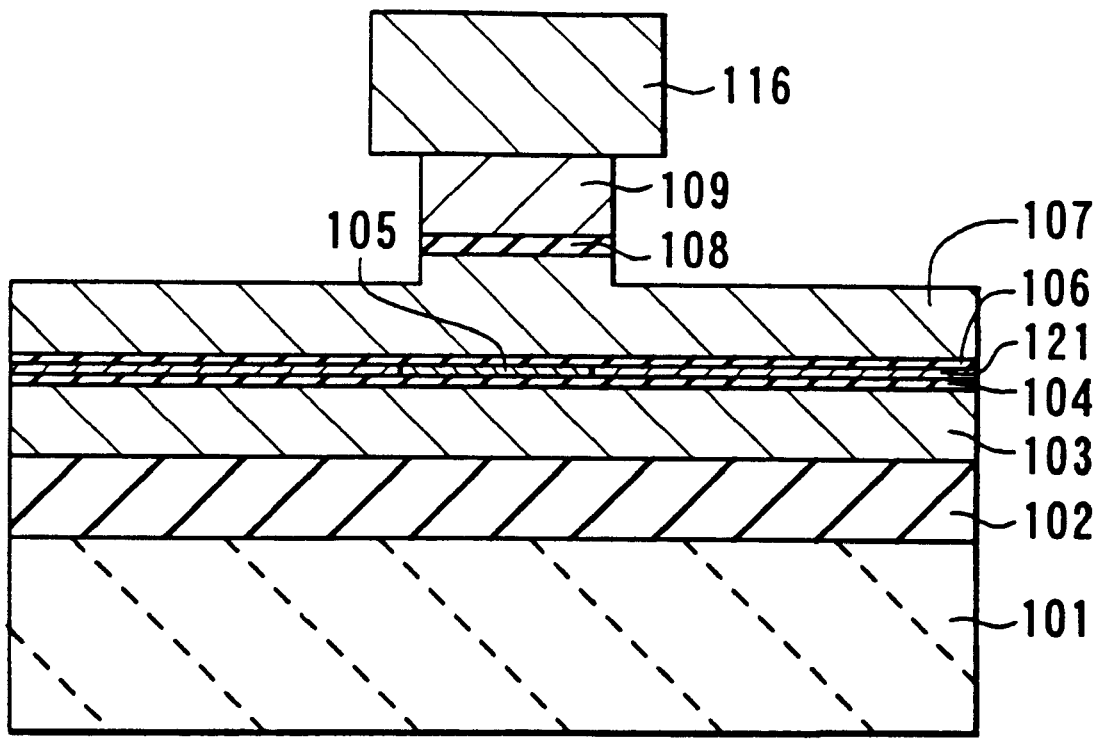
FIG. 25 is a cross section of the related-art thin-film magnetic head parallel to the air bearing surface.
Figure 26:
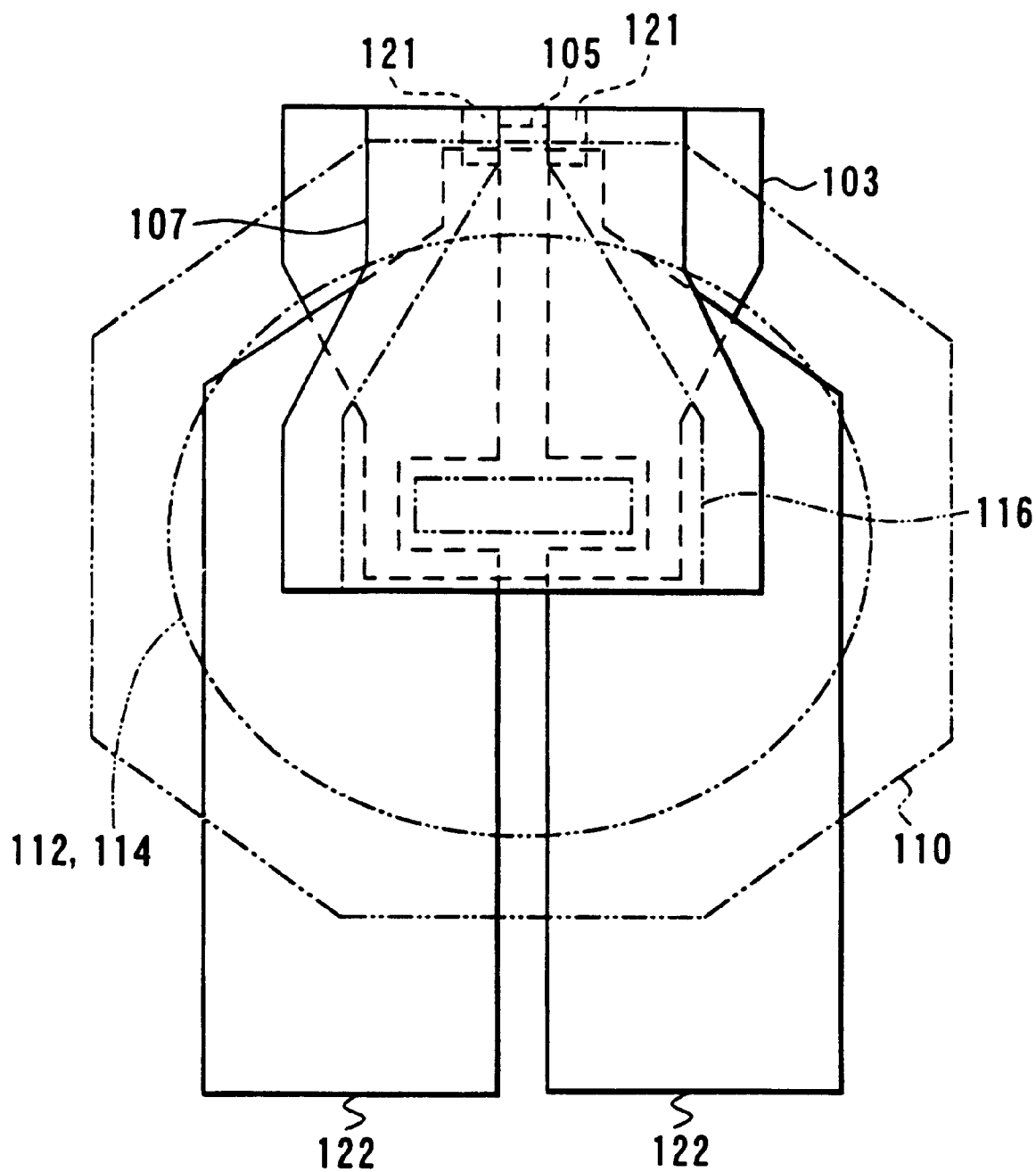
FIG. 26 is a top view of the related-art thin-film magnetic head in the state in one of the manufacturing steps.
Figure 27:
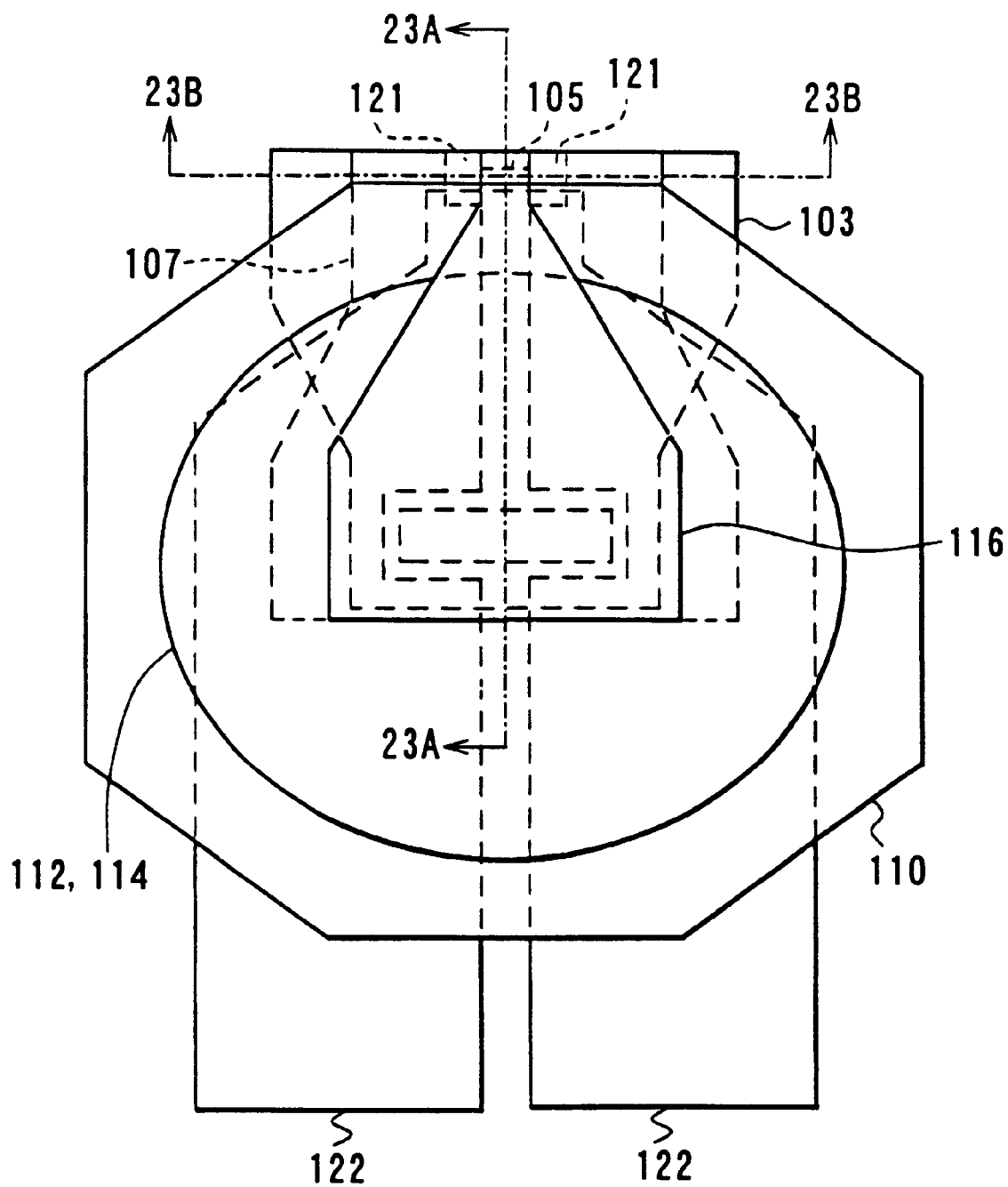
FIG. 27 is a top view of the related-art thin-film magnetic head.

FIG. 13 is a top view of the thin-film magnetic head of the embodiment manufactured through the foregoing process in the state in one of the manufacturing steps. FIG. 14 is a top view of the thin-film magnetic head of the embodiment manufactured through the foregoing process. In FIG. 14 the overcoat layer 87 is omitted. FIG. 14 shows the state before mechanical processing of the slider is performed. Numeral 69 of FIG. 14 indicates the contact hole for connecting the second portion 54b to the first portion 54a of the top shield layer. FIG. 10A to FIG. 12A are cross sections taken along line 12A—12A of FIG. 14. FIG. 10B to FIG. 12B are cross sections taken along line 12B—12B of FIG. 14.

As shown in FIG. 14, as in the first embodiment, the shield layers 71 may be provided for shielding at least portions of the conductive layers 57 in this embodiment. The shield layers 71 cover the portions of the conductive layers 57 that do not face the second portion 54b of the top shield layer. In the step of forming the top pole layer 86, for example, the shield layers 71 may be made of the same material as the top pole layer 86 at the same time.

The remainder of configuration, functions and effects of the embodiment are similar to those of the first embodiment.

According to the invention thus described, the thin-film magnetic head sub-structure comprising the first shield layer, the first portion of the second shield layer, and at least part of the thin-film coils is manufactured. In response to the customer's requests, the second portion of the second shield layer, the MR element, and the second magnetic layer are added to the sub-structure. The thin-film magnetic head is thus manufactured. As a result, according to the invention, it is possible to provide thin-film magnetic heads that meet the specifications required by the customer in a short period of time. The sub-structures may be inspected so that it is possible to process only conforming sub-structures into thin-film magnetic heads. The yields of the heads are thereby improved.

At least part of the conductive layers connected to the MR element may be placed between the first shield layer and the first portion of the second shield layer, being insulated therefrom. In this case, the insulation property is improved between the conductive layers and each shield layer. Furthermore, since the conductive layers are not placed between the shield layers with insulating layers in between, the insulation property is improved between each shield layer and the conductive layers connected to the MR element without increasing the thickness of the insulating layer between the MR element and each shield layer. Since it is possible to make the conductive layers sufficiently thick, the wiring resistance of the conductive layers is further reduced. Furthermore, the portions of the conductive layers placed between the first shield layer and the first portion of the second shield layer are shielded, being placed between the two shield layers. The effects of noises on the conductive layers are thereby reduced.

If the shield layers are provided for shielding at least portions of the conductive layers, the effects of noises on the conductive layers are further reduced.

The present invention is not limited to the foregoing embodiments. For example, although the top pole layer of the recording head is made up of the single layer in the foregoing embodiments, the top pole layer may be made of two layers of a top pole tip and a top yoke layer.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head comprising:
   a reproducing head including: a magnetoresistive element; a first shield layer and a second shield layer for shielding the magnetoresistive element, portions of the first shield layer and the second shield layer that face a recording medium being opposed to each other with the magnetoresistive element in between; a first insulating layer provided between the magnetoresistive element and the first shield layer and a second insulating layer provided between the magnetoresistive element and the second shield layer;
   a recording head including: a first magnetic layer and a second magnetic layer magnetically coupled to each other and each made up of at least one layer and including magnetic pole portions opposed to each other and each located in a respective end region of the magnetic layers that faces toward a recording medium; a gap layer placed between the pole portions of the first and second magnetic layers; and a thin-film coil at least part of which is placed between the first and second magnetic layers and insulated from the first and second magnetic layers; and
   a substrate having a top surface, wherein:
      the reproducing head and the recording head are stacked on the top surface of the substrate;
      the second shield layer includes a first portion and a second portion that are separate from each other;
      the first shield layer and the first portion of the second shield layer are placed in one plane that is parallel to the top surface of the substrate, and are insulated from each other by an insulating film;
      the second portion of the second shield layer is connected to the first portion and opposed to the first shield layer with the magnetoresistive element in between; and
      the second shield layer also functions as the first magnetic layer;
   the method including the steps of:
      forming the first shield layer and the first portion of the second shield layer to be placed in the one plane and insulated from each other;
      forming at least part of the thin-film coil on the first portion of the second shield layer such that the coil is insulated from the first portion;
      forming the first insulating layer on the first shield layer;
      forming the magnetoresistive element on the first insulating layer;
      forming the second insulating layer on the magnetoresistive element;
      forming the second portion of the second shield layer on the second insulating layer;
      forming the gap layer on the second portion; and
      forming the second magnetic layer on the gap layer.

2. The method according to claim 1, further including the step of forming at least part of a conductive layer to be connected to the magnetoresistive element such that the at least part of the conductive layer is placed between the first shield layer and the first portion of the second shield layer, the conductive layer being insulated from the first shield layer and the first portion by the insulating film.

3. The method according to claim 2, further including the step of forming a shield layer for shielding the at least part of the conductive layer.

4. The method according to claim 3, wherein the step of forming the shield layer for shielding the at least part of the conductive layer is performed at the same time as the step of forming the second magnetic layer.

5. The method according to claim 2, wherein the at least part of the conductive layer and the at least part of the thin-film coil are formed in one step.

6. The method according to claim 2, wherein the at least part of the conductive layer is formed by plating.

7. The method according to claim 1, wherein the first shield layer and the first portion of the second shield layer are formed by plating.

8. A method of manufacturing a thin-film magnetic head sub-structure used for a thin-film magnetic head that comprises:
   a reproducing head including: a magnetoresistive element; a first shield layer and a second shield layer for shielding the magnetoresistive element, portions of the first shield layer and the second shield layer that face a recording medium being opposed to each other with the magnetoresistive element in between; a first insulating layer provided between the magnetoresistive element and the first shield layer and a second insulating layer provided between the magnetoresistive element and the second shield layer;
   a recording head including: a first magnetic layer and a second magnetic layer magnetically coupled to each other and each made up of at least one layer and including magnetic pole portions opposed to each other and each located in a respective end region of the magnetic layers that faces toward a recording medium; a gap layer placed between the pole portions of the first and second magnetic layers; and a thin-film coil at least part of which is placed between the first and second magnetic layers and insulated from the first and second magnetic layers; and
   a substrate having a top surface, wherein:
      the reproducing head and the recording head are stacked on the top surface of the substrate;
      the second shield layer includes a first portion and a second portion that are separate from each other;
      the first shield layer and the first portion of the second shield layer are placed in one plane that is parallel to the top surface of the substrate, and are insulated from each other by an insulating film;
      the second portion of the second shield layer is connected to the first portion and opposed to the first shield layer with the magnetoresistive element in between; and the second shield layer also functions as the first magnetic layer;

the method of manufacturing the sub-structure including the steps of:

forming the first shield layer and the first portion of the second shield layer to be placed in the one plane and insulated from each other; and forming at least part of the thin-film coil on the first portion of the second shield layer such that the coil is insulated from the first portion.

9. The method according to claim 8, further including the step of forming at least part of a conductive layer to be connected to the magnetoresistive element such that the at least part of the conductive layer is placed between the first shield layer and the first portion of the second shield layer, the conductive layer being insulated from the first shield layer and the first portion by the insulating film.

10. The method according to claim 9, wherein the at least part of the conductive layer and the at least part of the thin-film coil are formed in one step.

11. The method according to claim 9, wherein the at least part of the conductive layer is formed by plating.

12. The method according to claim 8, wherein the first shield layer and the first portion of the second shield layer are formed by plating.

* * * * *